United States Patent [19]
Lee

[11] Patent Number: 5,452,104
[45] Date of Patent: Sep. 19, 1995

[54] ADAPTIVE BLOCK SIZE IMAGE COMPRESSION METHOD AND SYSTEM

[75] Inventor: Chong U. Lee, San Diego, Calif.

[73] Assignee: Qualcomm Incorporated, San Diego, Calif.

[21] Appl. No.: 102,124

[22] Filed: Aug. 4, 1993

Related U.S. Application Data

[63] Continuation of Ser. No. 4,213, Jan. 13, 1993, abandoned, which is a continuation of Ser. No. 710,216, Jun. 4, 1991, abandoned, which is a continuation-in-part of Ser. No. 487,012, Feb. 27, 1990, Pat. No. 5,021,891.

[51] Int. Cl.⁶ .......................................... H04N 1/415
[52] U.S. Cl. ................. 358/433; 358/261.2; 348/404
[58] Field of Search ............... 358/261.1, 261.2, 261.3, 358/426, 427, 432, 433; 348/403, 404, 405; 382/41, 43, 56; H04N 1/45

[56] References Cited

U.S. PATENT DOCUMENTS

| | | | |
|---|---|---|---|
| 4,774,574 | 9/1988 | Daly et al. | 358/133 |
| 4,776,030 | 10/1988 | Tzou | 358/432 |
| 4,922,341 | 5/1990 | Strobach | 358/136 |
| 4,924,309 | 5/1990 | Hartnack et al. | 358/133 |
| 4,984,076 | 1/1991 | Watanabe et al. | 358/133 |
| 5,021,891 | 6/1991 | Lee | 358/432 |
| 5,045,938 | 9/1991 | Sugiyama | 358/133 |
| 5,073,820 | 12/1991 | Nakagawa et al. | 358/209 |
| 5,073,821 | 12/1991 | Juri . | |
| 5,107,345 | 4/1992 | Lee | 358/136 |
| 5,126,857 | 6/1992 | Watanabe et al. | 358/432 |
| 5,142,380 | 8/1992 | Sakagami et al. | 358/432 |
| 5,227,878 | 7/1993 | Puri et al. . | |
| 5,272,528 | 12/1993 | Juri et al. . | |
| 5,335,016 | 8/1994 | Nakagawa . | |

OTHER PUBLICATIONS

"Discrete Cosine Transform" by N. Ahmed et al., IEEE Transactions on Computers, Jan. 1974, pp. 90–93.
"Adaptive Coding of Monochrome and Color Images" by Wen-Hsiung Chen et al., IEEE Transactions on Communications, vol. Com–25 No. 11, Nov. 1977 pp. 1285–1292.
"Interframe Cosine Transform Image Coding" by John A. Roese et al., IEEE Transactions on Communications, vol. Com–25, No. 11, Nov. 1977, pp. 1329–1339.
"Distributions of the Two–Dimensional DCT Coefficients for Images" by Randall C. Raininger et al., IEEE Transactions on Communications, vol. Com–31, No. 6, Jun. 1983, pp. 835–839.
"Scene Adaptive Coder": by Wen–Hsiung Chen et al., IEEE Transactions on Communications, vol. Com–32, No. 3, Mar. 1984, pp. 225–232.
"Hamming Coding of DCT–Compressed Images over Noisy Channels" by David R. Comstock et al., IEEE Transactions on Communications, vol. Com–32, No. 7, Jul. 1984, pp. 856–861.
"Variable Block–Size Transform Image Coder" by Its' Hak Dinstein et al., IEEE Transactions on Communications, vol. 38, No. 11, Nov. 1990, pp. 2073–2078.
"Quadtree–Structured Recursive Plane Decomposition Coding of Images" by Peter Strobach, IEEE Transactions on Signal Processing, vol. 39, No. 6, Jun. 1991.

*Primary Examiner*—Edward L. Coles, Sr.
*Assistant Examiner*—Kim Yen Vu
*Attorney, Agent, or Firm*—Russell B. Miller; Sean English

[57] ABSTRACT

In an adaptive block size image compression method and system for compressing image data, a respective method and system for further compressing the image data for transmission. Each block and corresponding sub-blocks of pixel data is subjected to a discrete cosine transform (DCT) operation. Varying levels of sub-blocks of resulting corresponding transform coefficients are selected for construction into a composite transform coefficient block corresponding to each input block of pixel data. The selection of transform coefficient block size for the composite block is determined by a comparison process between transform block and sub-block coding efficiency. The composite block is variable length coded to further reduce bit count in the compressed data. A discrete quadtree transform (DQT) operation is in supplement of the adaptive block size block selection with coefficient replacement to optimize image data compression.

61 Claims, 10 Drawing Sheets

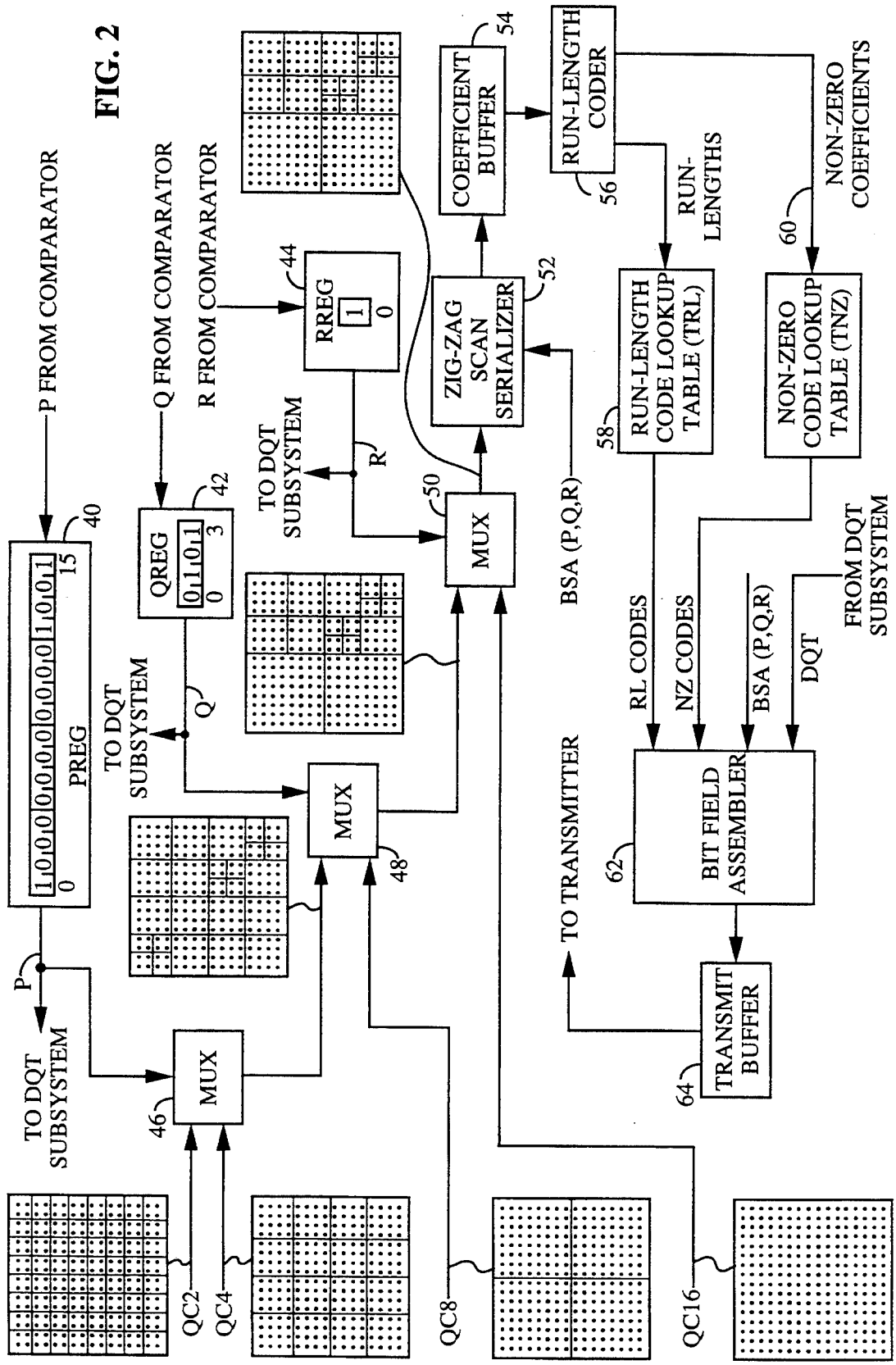

ADAPTIVE BLOCK SIZE IMAGE COMPRESSION METHOD AND SYSTEM

This application is a continuation of application Ser. No. 08/004,213, filed Jan. 13, 1993, abandoned, which is a continuation of application Ser. No. 07/710,216, filed Jun. 4, 1991, now abandoned, which is a continuation-in-part application of U.S. patent application Ser. No. 487,012 filed Feb. 27, 1990, now U.S. Pat. No. 5,021,891 issued Jun. 4, 1991, and as such relates to image processing.

BACKGROUND OF THE INVENTION

I. Field of the Invention

More particularly, the present invention relates to a novel and improved method and system for data compression in an image signal compression scheme utilizing adaptively sized blocks and sub-blocks of encoded discrete cosine transform (DCT) coefficient data.

II. Description of the Related Art

In the field of transmission and reception of television signals, various improvements are being made to the NTSC (National Television Systems Committee) System. Developments in the field of television are commonly directed towards a high definition television (HDTV) System. In the development of HDTV, system developers have merely applied the Nyquist sampling theorem and low pass filtering design with varying degrees of success. Modulation in these systems amounts to nothing more than a simple mapping of an analog quantity to a value of signal amplitude or frequency.

It has most recently been recognized that it is possible to achieve further improvements in HDTV systems by using digital techniques. Many of the proposed HDTV transmission formats share common factors. These systems all involve digital processing of the video signal, which necessitates analog-to-digital (A/D) conversion of the video signal. An analog transmission format is then used thereby necessitating conversion of the digitally processed picture back to analog form for transmission.

The receiver/processor must then reverse the process in order to provide image display. The received analog signal is therefor digitized, stored, processed and reconstructed into a signal according to the interface format used between the receiver/processor and the HDTV display. Furthermore the signal is most likely converted back to analog form once more for display. It is noted however that the proposed HDTV formats utilize digital transmission for transmission of control, audio and authorization signals.

Many of the conversion operations mentioned above, however, may be avoided using a digital transmission format which transmits the processed picture, along with control, audio and authorization signals, using digital modulation techniques. The receiver may then be configured as a digital modem with digital outputs to the video processor function. Of course, the modem requires an A/D function as part of operation, but this implementation may only require a 4-bit resolution device rather than the 8-bit resolution device required by analog format receivers.

Digital transmission is superior to analog transmission in many ways. Digital transmissions provide efficient use of power which is particularly important to satellite transmission and in military applications. Digital transmissions also provide a robustness of the communications link to impairments such as multipath and jamming. Furthermore digital transmission facilitates ease in signal encryption, necessary for military and many broadcast applications.

Digital transmission formats have been avoided in previous HDTV system proposals primarily because of the incorrect belief that they inherently require excessive bandwidth. Therefore in order to realize the benefits of digital transmission, it is necessary to substantially compress the HDTV signal. HDTV signal compression must therefor be achieved to a level that enables transmission at bandwidths comparable to that required by analog transmission formats. Such levels of signal compression coupled with digital transmission of the signal will enable a HDTV system to operate on less power with greater immunity to channel impairments.

It is therefore an object of the present invention to provide a novel and improved method and system for enhancing the compression of HDTV signals so as to enable digital transmission at bandwidths comparable to that of analog transmissions of conventional TV signals.

SUMMARY OF THE INVENTION

The present invention is a novel and improved method and system for further compressing image data for transmission and for reconstruction of the image data upon reception. The image compression system includes a subsystem for generating from a block of input pixel data a corresponding composite block of discrete cosine transform (DCT) data optimized for encoding for a minimized transmission data rate. An additional subsystem is utilized to replace certain DCT coefficients with Discrete Quadtree Transform (DQT) coefficients in order to further reduce the data rate.

In the present invention a transform means receives an input block of pixel data and performs a discrete cosine transform (DCT) operation on the block of pixel data and on at least one predetermined level of constituent sub-blocks thereof. The transform means provides an output of corresponding block and sub-blocks of DC and AC DCT coefficient values.

An additional transform means also receives the input block of pixel data and performs a discrete quadtree transform (DQT) operation thereupon so as to generate a block of DQT coefficient values.

A block size assignment means receives, for the block and each sub-block, AC DCT coefficient values and a DQT value which in replacement of the DC DCT coefficient value. The block size assignment means determines, for the block and each corresponding group of constituent sub-blocks of DQT/DCT coefficient values, a bit count value corresponding to a number of bits required to respectively encode the block and each corresponding group of constituent sub-blocks of DQT/DCT coefficient values according to a predetermined coding format. The block assignment means further determines, from the bit count values, ones of the block and group of constituent sub-blocks of DQT/DCT coefficient values requiring a lesser number of bits to encode according to the predetermined coding format, and providing an output of a corresponding selection value.

A DCT selection means receives the selection value and the block and sub-blocks of DCT coefficient values and selects the block of DCT coefficient values or ones of the DCT coefficient values sub-blocks in accordance with the selection value. The DCT selection means provides an output of a corresponding composite block of DCT coefficient values formed from the selected block or sub-blocks of DCT coefficient values. A DQT selection means also receives the selection value and the block of DQT coefficient values and selects ones of the DQT coefficient values in accordance with the selection value. The each selected DQT coefficient values corresponds to a DC DCT coefficient values of the selected block or sub-block.

A DCT ordering means receives and orders the composite block of DCT coefficient values according to a predetermined ordering format. The ordering means provides an output of the ordered DCT coefficient values to an encoder means that codes the ordered DCT coefficient values according to a predetermined coding format. The encoder means provides an output of the coded ordered DCT coefficient values.

A DQT ordering means receives selected DQT coefficient and orders the selected DQT coefficients in a format such that each maintains corresponds with a respective one of the DC DCT coefficients in the coded ordered coefficient values. The DQT ordering means provides an output of the ordered DQT coefficient values.

An assembler means receives the coded ordered DCT coefficient values, the ordered DQT values and the selection value. The assembler means generates an coded image value by removing the DC coefficient values in the ordered coded DCT coefficient values while combining the selection value with the remaining AC DCT coefficients in the ordered coded DCT coefficient values and the ordered DQT coefficient values. The coded image value is representative of the input block of pixel data and is of a reduced bit count with respect to a bit count of the input block of pixel data. The assembler means provides an output of the coded image value for transmission.

The present invention also provides for a novel and improved method for reconstructing from each received coded image value a corresponding block pixel of pixel data. The present invention further envisions a novel and improved method for compressing an image signal as represented by a block of pixel data and for reconstructing the image signal from the compressed image signal.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 2 is a block diagram illustrating the further processing elements for the adaptive block size image compression system for selecting block sizes of DCT coefficient data so as to generate a composite block of DCT coefficient data and the encoding of the composite block for transmission;

FIGS. 4a and 4b are graphs respectively illustrating in graphical form the selected block zig-zag scan serialization ordering sequence within the sub-blocks and between sub-blocks for an exemplary composite block of DCT coefficient data whose block size selection was made according to the block size assignment data of FIG. 3a;

DETAILED DESCRIPTION OF THE PREFERRED EMBODIMENTS

Figure 1:
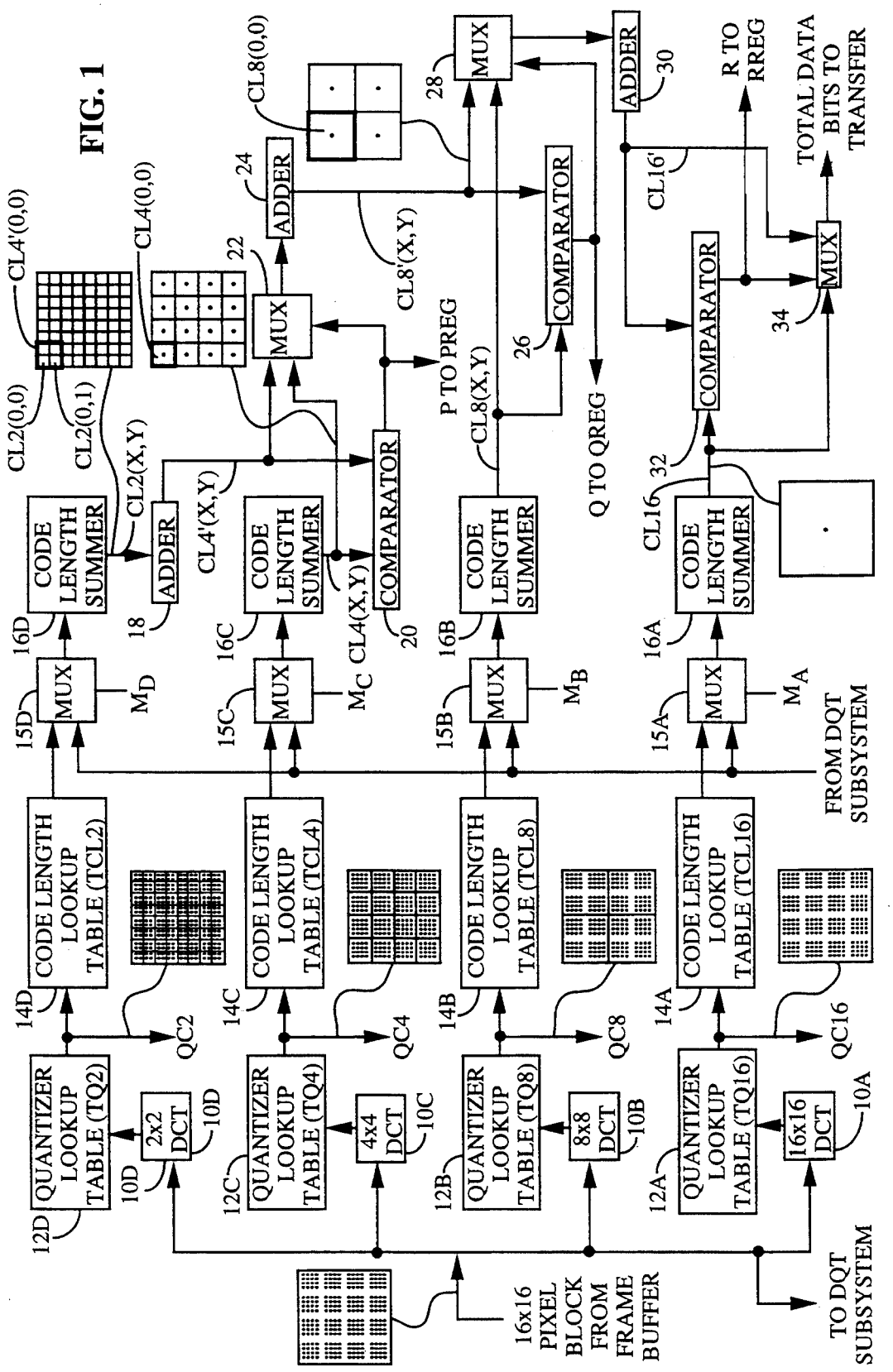
FIG. 1 is a block diagram illustrating the processing elements of the adaptive block size image compression system for providing DCT coefficient data and block size determination.

In order to facilitate digital transmission of HDTV signals and enjoy the benefits thereof, it is necessary to employ some form of signal compression. In order to achieve such high definition in the resulting image, it is also important that high quality of the image also be maintained. The discrete cosine transform (DCT) techniques have been shown to achieve a very high compression. One such article which illustrates the compression factor is that entitled "Scene Adaptive Coder" by Wen-Hsiung Chen et al., *IEEE Transactions on Communications*, Vol. Com-32, No. 3, March, 1984. However, the quality of reconstructed pictures is marginal even for video conferencing applications.

With respect to the DCT coding techniques, the image is composed of pixel data which is divided into an array of non-overlapping blocks, N×N in size. Strictly for black and white television images each pixel is represented by an 8-bit word whereas for color television each pixel may be represented by a word comprised of up to 24-bits. The blocks in which the image is divided up to is typically a 16×16 pixel block, i.e. N=16. A two-dimensional N×N DCT is performed in each block. Since DCT is a separable unitary transformation, a two-dimensional DCT is performed typically by two successive one-dimensional DCT operations which can result in computational savings. The one-dimensional DCT is defined by the following equation:

$$X(k) = \frac{2C(k)}{N} \sum_{n=0}^{N-1} x(n) \cos \frac{\pi(2n+1)k}{2N} \quad (1)$$

where, $$C(0) = \frac{1}{\sqrt{2}} \quad (2)$$

and,

-continued $$C(k) = 1 \text{ for } k = 1,2,3, \ldots N - 1. \qquad (3)$$

For television images, the pixel values are real so that the computation does not involve complex arithmetic. Furthermore, pixel values are non-negative so that the DCT component X(0) is always positive and usually has the most energy. In fact, for typical images, most of the transform energy is concentrated around DC. This energy compaction property makes the DCT such an attractive coding method.

It has been shown in the literature that the DCT approaches the performance of the optimum Karhunen-Loeve Transform (KLT), as evidenced by the article entitled "Discrete Cosine Transform" by N. Ahmed et al., *IEEE Transactions on Computers*, January 1974, pages 90–93. Basically, the DCT coding performs a spatial redundancy reduction on each block by discarding frequency components that have little energy, and by assigning variable numbers of bits to the remaining DCT coefficients depending upon the energy content. A number of techniques exist that quantize and allocate bits to minimize some error criterion such as MSE over the block. Typically the quantized DCT coefficients are mapped into a one-dimensional string by ordering from low frequency to high frequency. The mapping is done according to diagonal zig-zag mapping over the block of DCT coefficients. The locations of the zero (or discarded) coefficients are then coded by a run-length coding technique.

In order to optimally quantize the DCT coefficient, one needs to know the statistics of the transform coefficients. Optimum or sub-optimal quantizers can be designed based on the theoretical or measured statistics that minimize the over-all quantization error. While there is not complete agreement on what the correct statistics are, various quantization schemes may be utilized, such as that disclosed in "Distribution of the Two-Dimensional DCT Coefficients for Images" by Randall C. Reininger et al., *IEEE Transactions on Communications*, Vol. 31, No. 6, June 1983, Pages 835–839. However, even a simple linear quantizer has been utilized which has provided good results.

Aside from deciding on a quantization scheme, there are two other methods to consider in order to produce the desired bit rate. One method is to threshold the DCT coefficient so that the small values are discarded and set to zero. The other technique is to linearly scale (or normalize) the coefficients to reduce the dynamic range of the coefficients after floating point to integer conversion for coding. Scaling is believed to be superior to thresholding in retaining both the subjective as well as objective signal to noise ratio quality. Therefore the main variable in the quantization process will be the coefficient scale factor which can be varied to obtain the desired bit rate.

The quantized coefficients usually are coded by Huffman codes designed from the theoretical statistics or from the measured histogram distribution. Most of the coefficients are concentrated around the low values so that Huffman coding gives good results. It is believed that Huffman codes generated from a measured histogram performs very close to theoretical limits set by the entropy measure. The location of the zero coefficients are coded by run-length codes. Because the coefficients are ordered from low to high frequencies, the runs tend to be long such that there is a small number of runs. However, if the number of runs in terms of length were counted, the short runs dominate so that Huffman coding the run-lengths reduces the bit rate even more.

An important issue that concerns all low bit-rate compression schemes is the effect of channel bit error on the reconstruction quality. For DCT coding, the lower frequency coefficients are more vulnerable especially the DC term. The effect of the bit error rate (BER) on the reconstruction quality at various compression rates has been presented in the literature. Such issues are discussed in the article entitled "Intraframe Cosine Transfer Image Coding" by John A. Roese et al., *IEEE Transactions on Communications*, Vol. Com-25, No. 11, November 1977, Pages 1329–1339. The effect of BER becomes noticeable around $10^{-3}$ and it becomes significant at $10^{-2}$. A BER of $10^{-5}$ for the transmission subsystem would be very conservative. If necessary, a scheme can be devised to provide additional protection for lower frequency coefficients, such as illustrated in the article "Hamming Coding of DCT-Compressed Images over Noisy Channels" by David R. Comstock et al., *IEEE Transactions on Communications*, Vol. Com-32, No. 7, July 1984, Pages 856–861.

It has been observed that most natural images are made up of blank or relatively slow varying areas, and busy areas such as object boundaries and high-contrast texture. Scene adaptive coding schemes take advantage of this factor by assigning more bits to the busy area and less bits to the blank area. For DCT coding this adaptation can be made by measuring the busyness in each transform block and then adjusting the quantization and bit allocation from block to block. The article entitled "Adaptive Coding of Monochrome and Color images" by Wen-Hsiung Chen et al., *IEEE Transactions on Communications*, Vol. Com-25, No. 11, November 1977, Pages 1285–1292, discloses a method where block energy is measured with each block classified into one of four classes. The bit allocation matrix is computed iteratively for each class by examining the variance of the transform samples. Each coefficient is scaled so the desired number of bits result after quantization. The overhead information that must be sent are the classification code, the normalization for each block, and four bit allocation matrices. Utilization of this method has produced acceptable results at 1 and 0.5 bits per pixel.

Further bit rate reduction was achieved by Chen et al in the previously mentioned article "Scene Adaptive Coder" where a channel buffer is utilized to adaptively scale and quantize the coefficients. When the buffer becomes more than half full, a feedback parameter normalizes and quantizes the coefficients coarsely to reduce the bits entering the buffer. The converse happens when the buffer becomes less than half full. Instead of transmitting the bit allocation matrices, they run-length code the coefficient locations and Huffman code the coefficients as well as the run-lengths. Such an implementation has shown good color image reconstructions at 0.4 bits per pixel. Although these results look very good when printed, the simulation of the system shows many deficiencies. When images are viewed under normal to moderate magnification smoothing and blocking effects are visible.

In the image compression method and system disclosed herein, intraframe coding (two-dimensional processing) is utilized over interframe coding (three-dimensional processing). One reason for the adoption of intraframe coding is the complexity of the receiver required to process interframe coding signals. Interframe coding inherently require multiple frame buffers in addition to more complex processing circuits. While in commercialized systems there may only be a small number of transmitters which contain very complicated hardware, the receivers must be kept as simple as possible for mass production purposes.

The second most important reason for using intraframe coding is that a situation, or program material, may exist that can make a three-dimensional coding scheme break down and perform poorly, or at least no better than the intraframe coding scheme. For example, 24 frame per second movies can easily fall into this category since the integration time, due to the mechanical shutter, is relatively short. This short integration time allows a higher degree of temporal aliasing than in TV cameras for rapid motion. The assumption of frame to frame correlation breaks down for rapid motion as it becomes jerky. Practical consideration of frame to frame registration error, which is already noticeable on home videos become worse at higher resolution.

An additional reason for using intraframe coding is that a three-dimensional coding scheme is more difficult to standardize when both 50 Hz and 60 Hz power line frequencies are involved. The use of an intraframe scheme, being a digital approach, can adapt to both 50 Hz and 60 Hz operation, or even to 24 frame per second movies by trading off frame rate versus spatial resolution without inducing problems of standards conversion.

Although the present invention is described primarily with respect to black and white, the overhead for coding color information is surprisingly small, on the order of 10 to 15% of the bits needed for the luminance. Because of the low spatial sensitivity of the eye to color, most researchers have converted a color picture from RGB space to YIQ space, sub-sample the I and Q components by a factor of four in horizontal and vertical direction. The resulting I and Q components are coded similarly as Y (luminance). This technique requires 6.25% overhead each for the I and Q components. In practice, the coded Q component requires even less data than the I component. It is envisioned that no significant loss in color fidelity will result when utilizing this class of color coding techniques.

In the implementation of DCT coding techniques, the blocking effect is the single most important impairment to image quality. However, it has been realized that the blocking effect is reduced when a smaller sized DCT is used. The blocking effect becomes virtually invisible when a $2\times 2$ DCT is used.

However, when using the small-sized DCT, the bit per pixel performance suffers somewhat. However, a small-sized DCT helps the most around sharp edges that separate relatively blank areas. A sharp edge is equivalent to a step signal which has significant components at all frequencies. When quantized, some of the low energy coefficients are truncated to zero. This quantization error spreads over the block. This effect is similar to a two-dimensional equivalent of the Gibbs phenomenon, i.e. the ringing present around a step pulse signal when part of the high frequency components are removed in the reconstruction process. When adjacent blocks do not exhibit similar quantization error, the block with this form of error stands out and creates the blocking effect. Therefore by using smaller DCT block sizes the quantization error becomes confined to the area near the edge since the error cannot propagate outside the block. Thereby, by using the smaller DCT block sizes in the busy areas, such as at edges, the error is confined to the area along the edge. Furthermore, the use of the small DCT block sizes is further enhanced with respect to subjective quality of the image due to the spatial masking phenomena in the eye that hides noise near busy areas.

The adaptive block size DCT technique implemented in the present invention may be simply described as a compare-and-replace scheme. A b $16\times 16$ pixel data array or block of the image is coded as in the fixed block size DCT techniques, however, block and sub-block sizes of $16\times 16$, $8\times 8$, $4\times 4$ and $2\times 2$ are used. For each $4\times 4$ block, the number of bits to code the block by using four $2\times 2$ sub-blocks inside the $4\times 4$ block is examined. If the sum of the four $2\times 2$ sub-blocks is smaller than the bits needed to code it as a $4\times 4$ block, the $4\times 4$ block is replaced by four $2\times 2$ sub-blocks. Next, each of the $8\times 8$ blocks are examined to determine if they can in turn be replaced by four $4\times 4$ sub-blocks which were optimized in the previous stage. Similarly, the $16\times 16$ block is examined to determine if it can be replaced by four $8\times 8$ sub-blocks that were optimized in the previous stage. At each stage the optimum block/sub-block size is chosen so that the resulting block size assignment is optimized for the $16\times 16$ block.

Since 8-bits are used to code the DC coefficients regardless of the block size, utilization of small blocks results in a larger bit count. For this reason, $2\times 2$ blocks are used only when their use can lower the bit count. The resulting sub-block structure can be conveniently represented by an inverted quadtree (as opposed to a binary tree), where the root corresponding to the $16\times 16$ block in each node has four possible branches corresponding to four sub-blocks. An example of a possible inverted quadtree structure is illustrated in FIG. 3b.

Each decision to replace a block with smaller sub-blocks requires one bit of information as overhead. This overhead ranges from one bit for a $16\times 16$ block up to 21 bits $(1+4+16)$ when $4\times 4$ and $2\times 2$ sub-blocks are used everywhere within in the $16\times 16$ block. This overhead is also incorporated into the decision making process to ensure that the adaptive block size DCT scheme always uses the least number of bits to code each $16\times 16$ block.

Although block sizes discussed herein as being $N\times N$ in size, it is envisioned that various block sizes may be used. For example an $N\times M$ block size may be utilized where both N and M are integers with M being either greater than or lesser than N. Another important aspect is that the block is divisible into at least one level of sub-blocks, such as $N/i\times N/i$, $N/i\times N/j$, $N/i\times M/j$, and etc. where i and j are integers. Furthermore, the exemplary block size as discussed herein is a $16\times 16$ pixel block with corresponding block and sub-blocks of DCT coefficients. It is further envisioned that various other integer such as both even or odd integer values may be used, e.g. $9\times 9$.

Due to the importance of these overhead bits for the quadtree, these bits need to be protected particularly well against channel errors. One can either provide an extra error correction coding for these important bits or provide and error recovery mechanism so that the effect of channel errors is confined to a small area of the picture.

The adaptive block size DCT compression scheme of the present invention can be classified as an intraframe coding technique, where each frame of the image sequence is encoded independently. Accordingly, a single frame still picture can be encoded just as easily without modification. The input image frame is divided into a number of 16×16 pixel data blocks with encoding performed for each block. The main distinction of the compression scheme of the present invention resides in the fact that the 16×16 block is adaptively divided into sub-blocks with the resulting sub-blocks at different sizes also encoded using a DCT process. By properly choosing the block sizes based on the local image characteristics, much of the quantization error can be confined to small sub-blocks. Accordingly small sub-blocks naturally line up along the busy area of the image where the perceptual visibility of the noise is lower than in blank areas.

In review, a conventional or fixed block size DCT coding assigns a fixed number of bits to each block such that any quantization noise is confined and distributed within the block. When the severity or the characteristics of the noise between adjacent blocks are different, the boundary between the blocks become visible with the effect commonly known as a blocking artifact. Scene adaptive DCT coding assigns a variable number of bits to each block thereby shifting the noise between fixed sized blocks. However, the block size is still large enough, usually 16×16, such that some blocks contain both blank and busy parts of the image. Hence the blocking artifact is still visible along image detail such as lines and edges. Using smaller block sizes such as 8×8 or 4×4 can greatly reduce the blocking artifact, however, at the expense of a higher data rate. As a result, the coding efficiency of DCT drops as the block size gets smaller.

In the embodiment in which the present invention is described an adaptive block size DCT technique is used in which optimal block size is chosen such that smaller blocks are used only when they are needed. As a result, the blocking artifact is greatly reduced without increasing the data rate. Although a number of different methods can be devised that determine block size assignment, an exemplary illustration of an embodiment is provided which assigns block sizes such that the total number of bits produced for each block is minimized. Using the DQT transform of the present invention in combination with the adaptive block size technique a further reduction in the data rate, on the order of 5% or greater, can be achieved.

FIGS. 1 and 2 illustrate an exemplary implementation of the adaptive block size DCT transform image signal compression scheme for converting N×N pixel data blocks into whole bit coded data. As discussed herein for purposes of illustration N=16. FIG. 1 illustrates the implementation of the DCT transform and block size determination elements. FIG. 2 illustrates the DCT coefficient data block selection according to the block size determination along with composite DCT coefficient data block bit coding.

In FIG. 1, an image signal as represented by a 16×16 block of digitized pixel data is received from the frame buffer (not shown). The pixel data may be either 8 bit black and white image data or 24 bit color image data. The 16×16 pixel block is input to a 16×16 two-dimensional discrete cosine transform (DCT) element 10a. The 16×16pixel block is also input as four 8×8 pixel blocks to 8×8 DCT element 10b, as eight 4×4 pixel blocks to 4×4 DCT element 10c, and as sixty-four 2×2 pixel blocks to 2×2 DCT element 10d. DCT elements 10a-10d may be constructed in integrated circuit form as is well known in the art. The 16×16 pixel block is also input is also provided in parallel to a DQT subsystem as discussed later herein with reference to FIG. 9.

DCT elements 10a-10d perform two-dimensional DCT operations on each respectively sized input block of pixel data. For example, DCT element 10a performs a single 16×16 transform operation, DCT element 10b performs four 8×8 DCT operations, DCT element 10c performs sixteen 4×4 DCT operations, while DCT element 10d performs sixty-four 2×2 DCT operations. Transform coefficients are output from each DCT element 10a-10d to a respective quantizer look up table 12a-12d.

Quantizer lookup tables 12a-12d may be implemented in conventional read only memory (ROM) form with memory locations containing quantization values. The value of each transform coefficient is used to address a corresponding memory location to provide an output data signal indicative of a corresponding quantized transform coefficient value. The output of quantizer lookup table 12a, indicated by the reference signal QC16, is a 16×16block of quantized DCT coefficient values. The output of quantizer lookup table 12b, indicated by the reference signal QC8, is comprised of a data block of four 8×8sub-blocks of quantized DCT coefficient values. The output of quantizer lookup table 12c, indicated by the reference signal QC4, is comprised of a data block of sixteen 4×4 sub-blocks of quantized DCT coefficient values. And finally, the output of quantizer lookup table 12d, indicated by the reference signal QC2, is comprised of a data block of sixty-four 2×2 sub-blocks of quantized DCT coefficient. Although not illustrated, the DC (lowest frequency) coefficients of each transform may be optionally treated separately rather than through the corresponding quantizer lookup table.

The outputs of quantizer lookup tables 12a-12d are respectively input to code length lookup tables 14a-14d. The quantized DCT coefficient values are each coded using variable length code, such as a Huffman code, in order to minimize the data rate. Code words and corresponding code lengths are found in the form of code length look up tables 14a-14d. Each of the quantized DCT coefficients QC2, QC4, QC8, and QC16 are used to look up in the code length tables the corresponding number of bits required to code each coefficient. Code length lookup tables 14a-14d may be implemented in read only memory form with the DCT coefficients addressing memory locations which contain respective code length values.

The number of bits required to code each block or sub-block is then determined by summing the code lengths in each block and sub-block. In the basic implementation of the adaptive block size coding scheme the code lengths for the DC and AC coefficients of each block and sub-block is used in determining the number of bits to code the respective block or sub-block. However in the case where the DQT subsystem is utilized, the value corresponding to the DC DCT coefficients output from code length lookup tables 14a-14d is replaced with a similar value from the DQT subsystem. Multiplexers 15a-15d are used to permit the DQT coefficient code length values output from the DQT subsystem to be provided to the respective code length summer 16a-16d. Multiplexers 15a-15d also permit the AC DCT coefficient code length values output from code length lookup tables 14a-14d to be provided to the respective code length summer 16a-16d.

The 256 code length values from code length lookup table 14a, comprised of 1 DC coefficient code length values and 255 AC coefficient code length values, are provided to multiplexer 15a. A DQT coefficient code length value is also provided to multiplexer 15a from the DQT subsystem. Multiplexer 15a is responsive to a control signal $M_a$ so as to provide the DQT coefficient code length value from the DQT subsystem to code length summer 16a in place of the DC DCT coefficient code length value from code length lookup table 14a. However, the 255 AC coefficient code length values are provided via multiplexer 15a to code length summer 16a. In code length summer 16a the number of bits required to code the 16×16block DQT/DCT coefficient block is determined by summing the code lengths for the block. Therefore for the 16×16block, code length summer 16a sums the 255 AC coefficient code length values along with the 1 DQT coefficient code length value. The output from code length summer 16a is the signal CL16, a single value indicative of the number of bits required to code the 16×16 block of quantized DQT/DCT coefficients.

The 256 code length values from code length lookup table 14b, comprised of a total of 4 DC coefficient code length values and 252 AC coefficient code length values, are provided to multiplexer 15b. Each of the four 8×8 blocks is comprised of 1 DC coefficient code length value and 63 AC coefficient code length values. For each DC DCT coefficient code length value provided to multiplexer 15b, a corresponding DQT coefficient code length value is provided to multiplexer 15b from the DQT subsystem. Multiplexer 15b is responsive to a control signal $M_b$ so as to provide the DQT coefficient code length value from the DQT subsystem to code length summer 16b in place of each of the 4 DC coefficient code length values from code length lookup table 14b. However, the 252 AC coefficient code length values from code length lookup table 14b are provided via multiplexer 15b to code length summer 16b. For each of the four 8×8 blocks, code length summer 16b sums the 63 AC coefficient code length values along with the DQT coefficient code length value so as to determine the number of bits required to code each 8×8 DQT/DCT coefficient sub-block. The output of code length summer 16b is four values indicated by the reference signal CL8 with each value corresponding to the sum of the code lengths in each of the four 8×8 DQT/DCT blocks.

Similarly, the 256 code length values from code length lookup table 14c, comprised of a total of 16 DC coefficient code length values and 240 AC coefficient code length values, are provided to multiplexer 15c. Each of the sixteen 4×4 blocks is comprised of 1 DC coefficient code length value and 15 AC coefficient code length values. For each DC DCT coefficient code length value provided to multiplexer 15c, a corresponding DQT coefficient code length value is provided to multiplexer 15c from the DQT subsystem. Multiplexer 15c is responsive to a control signal $M_c$ so as to provide the DC coefficient code length value from the DQT subsystem to code length summer 16c in place of each of the 16 DC coefficient code length values from code length lookup table 14c. However, the 240 AC coefficient code length values from code length lookup table 14c are provided via multiplexer 15c to code length summer 16b. For each of the sixteen 4×4 blocks, code length summer 16c sums the 15 AC coefficient code length values along with the DQT subsystem DC coefficient code length value so as to determine the number of bits required to code each 4×4 DQT/DCT coefficient sub-block. The output of code length summer 16c is sixteen values indicated by the reference signal CL4 with each value corresponding to the sum of the code lengths in each of the sixteen 4×4 DQT/DCT blocks.

Finally, the 256 code length values from code length lookup table 14d, comprised of a total of 64 DC coefficient code length values and 192 AC coefficient code length values, are provided to multiplexer 15d. Each of the sixty-four 2×2 blocks is comprised of 1 DC coefficient code length value and 3 AC coefficient code length values. For each DC DCT coefficient code length value provided to multiplexer 15d, a corresponding DQT coefficient code length value is provided to multiplexer 15d from the DQT subsystem. Multiplexer 15d is responsive to a control signal $M_d$ so as to provide the DC coefficient code length value from the DQT subsystem to code length summer 16d in place of each of the 64 DC coefficient code length values from code length lookup table 14d. However, the 192 AC coefficient code length values from code length lookup table 14d are provided via multiplexer 15d to code length summer 16d. For each of the sixty-four 2×2 blocks, code length summer 16d sums the 3 AC coefficient code length values along with the DQT subsystem DC coefficient code length value so as to determine the number of bits required to code each 2×2 DQT/DCT coefficient sub-block. The output of code length summer 16d is sixty-four values indicated by the reference signal CL2 with each value being the sum of the code lengths in each of the sixty-four 2×2 DQT/DCT blocks.

The values CL8, CL4, and CL2 are also identified with block position orientation indicia for discussion later herein. The position indicia is a simple x-y coordinate system with the position indicated by the subscript (x,y) associated with the values CL8, CL4, and CL2.

The block size assignment (BSA) is determined by examining values of CL2, CL4, CL8 and CL16. Four neighboring entries of $CL2_{(x,y)}$ are added and the sum is compared with the corresponding entry in $CL4_{(x,y)}$. The output of $CL2_{(x,y)}$ from code length summer 16d is input to adder 18 which adds the four neighboring entries and provides a sum value $CL4'_{(x,y)}$. For example, the values representative of blocks $CL2_{(0,0)}$, $CL2_{(0,1)}$, $CL2_{(1,0)}$, and $CL2_{(1,1)}$ are added to provide the value $CL4'_{(0,0)}$. The value output from adder 18 is the value $CL4'_{(x,y)}$ which is compared with the value $CL4_{(x,y)}$ output from code length summer 16c. The value $CL4'_{(x,y)}$ is input to comparator 20 along with the value $CL4_{(x,y)}$. Comparator 20 compares the corresponding input values from adder 18 and code length summer 16c so as to provides a bit value, P, that is output to a P register (FIG. 2) and as a select input to multiplexer 22.

In the example as illustrated in FIG. 1, the value $CL4'_{(0,0)}$ is compared with the value $CL4_{(0,0)}$. If the value $CL4_{(x,y)}$ is greater than the summed values of $CL4'_{(x,y)}$, comparator 20 generates a logical one bit, "1", that is entered into the P register. The "1" bit indicates that a corresponding 4×4 block of DCT coefficients can be coded more efficiently using four 2×2 sub-blocks. If not, a logical zero bit, "0", is entered into the P register, indicating that the 4×4 block is coded more efficiently using the corresponding 4×4 block.

The output of code length summer 16c and adder 18 are also provided as data inputs to multiplexer 22. In response to the "1" bit value output from comparator 20, multiplexer 22 enables the $CL4'_{(x,y)}$ value to be output therefrom to adder 24. However should the comparison result in a "0" bit value being generated by comparator 20, mutiplexer 22 enables the output $CL4_{(x,y)}$ from code length summer 16c to be input to adder 24. Adder 24 is used to sum the data input therefrom, as selected from the comparisons of the values of $CL4_{(x,y)}$ and $CL4'_{(x,y)}$. The result of the sixteen comparisons of the $CL4_{(x,y)}$ and the $CL4'_{(x,y)}$ data is added in adder 24 to generate a corresponding $CL8'_{(x,y)}$ value. For each of the sixteen comparisons of the $CL4_{(x,y)}$ and $CL4'_{(x,y)}$ values, the comparison result bit is sent to the P register.

The next stage in the determination of block size assignment is similar to that discussed with respect to the generation and comparison of the values CL4 and CL4'. The output of $CL8'_{(x,y)}$ is provided as an input to comparator 26 along with the output $CL8_{(x,y)}$ from code length summer 16b. If the corresponding entry in $CL8_{(x,y)}$ is greater than the summed value $CL8'_{(x,y)}$, comparator 26 generates a "1" bit which is output to the Q register (FIG. 2). The output of comparator 26 is also provided as a selected input to multiplexer 28 which also receives the values $CL8_{(x,y)}$ and $CL8'_{(x,y)}$ respectively from code length summer 16b and adder 24. Should the value output from comparator 26b be a "1" bit, the $CL8'_{(x,y)}$ value is output from multiplexer 28 to adder 30. However, should the value $CL8'_{(x,y)}$ be greater than the value $CL8_{(x,y)}$, comparator 26 generates a "0" bit that is sent to the Q register and also to the select input of multiplexer 28. Accordingly, the value $CL8_{(x,y)}$ is then input to adder 30 via multiplexer 28. Comparison results of comparator 26 are the Q values sent to the Q register. Again a "1" bit indicates that the corresponding 8×8 block of DCT coefficients may be more efficiently coded by smaller blocks such as all 4×4 blocks, all 2×2 blocks or a combination thereof as optimally determined by the smaller block comparisons. A "0" bit indicates that the corresponding 8×8 block of DCT coefficients can be more efficiently coded than any combination of smaller blocks.

The values input to adder 30 are summed and provided as an output value CL16' input to comparator 32. A second input is provided to comparator 32 as the value CL16 output from by code length summer 16a. Comparator 32 preforms a single comparison of the value CL16 and CL16'. Should the value CL16 be greater than the value CL16' a "1" bit is entered into the R register (FIG. 3). A "1" bit input to the R register is indicative that the block may be coded more efficiently using sub-blocks rather than a single 16×16 block. However should the value CL16' be greater than the value CL16, comparator 32 outputs a "0" bit to the R register. The "0" bit in the R register is indicative that the block of DCT coefficients may be coded more efficiently as a 16×16 block.

Comparator 32 is also provides the output R bit as a select input to multiplexer 34. Multiplexer 34 also has inputs for receiving the CL16 and CL16' values respectively provided from code length summer 16a and adder 30. The output from multiplexer 34 is the value CL16 should the R output bit be a "0" while the value CL16' is output should the R output bit be a "1". The output of multiplexer 34 is a value indicative of the total bits to be transmitted.

It should be noted that the overhead bits vary from one bit to up to twenty-one bits (1+4+16) when 4×4 and 2×2 blocks are used everywhere within the 16×16 block.

In FIG. 2, the P value output from comparator 20 (FIG. 1) is input serially to a sixteen-bit register, P register 40. Similarly, the output from comparator 26 is input serially to a four-bit register, Q register 42. Finally, the output from comparator 32 is input serially to a one-bit register, R register 44. The output from P register 40 is provided as a P output to the select input of multiplexer 46. Multiplexer 46 also has inputs as the QC2 and QC4 values respectively output from Quantizer lookup tables 12d and 12c. The output of multiplexer 46 is provided as an input to multiplexer 48, which also has as a second input for the QC8 values as output from quantizer lookup table 12b. A select input to multiplexer 48 is provided from the output of Q register 42. The output of multiplexer 48 is coupled as one input to multiplexer 50. The other input of multiplexer 50 is coupled to the output of quantizer lookup table 12a for receiving the values QC16. The select input of multiplexer 50 is coupled to the output of R register 44 so as to receive the output bit R.

As illustrated in FIG. 2, P register 40 includes a sequence of bit positions, 0–15, with corresponding bit values as determined by the comparison process as discussed with reference to FIG. 1. Similarly Q register 42 and R register 44 respectively have bit position 0–3 and 0 with corresponding data as determined with reference to FIG. 1. The data in the P, Q and R registers as illustrated in FIG. 2 is merely for the purpose of illustration.

As illustrated in FIG. 2, the value of P register 40 bit is used to select via multiplexer 46, QC2 data (four 2×2 blocks of quantized transform coefficients) or the corresponding QC4 data (a 4×4 block of quantized transform coefficients). Multiplexer 48, in response to the value of the bit output from Q register 42 selects between the output of multiplexer 46 and the value QC8 data. When the Q register bit value is a "1" bit, the output of multiplexer 46 as input to multiplexer 48 is selected for output of multiplexer 48. When the Q register bit value is a "0" bit, the output of multiplexer 48 is the QC8 value. Therefore, the output bit value of Q register 42 is used to select between four QC4 blocks or sub-blocks of QC2 values as output from multiplexer 46 or a corresponding single 8×8 block. As illustrated in FIG. 2, the four upper left hand blocks as output from multiplexer 46 include four 2×2 blocks with three neighboring 4×4 blocks. However with the bit of the Q register being a "0" bit, multiplexer 48 selects the 8×8 block as an output. This example illustrates the conditional replacement scheme.

The output of multiplexer 48 is coupled as an input to multiplexer 50. The other input of multiplexer 50 is provided with the Q16 data, the 16×16 block of quantized DCT coefficients as provided from quantizer lookup table 12a. The select input to multiplexer 50 is the output bit of the R register. In the example illustrated in FIG. 2, the bit output from R register 44 is a "1" bit thus selecting data as output from multiplexer 50 that which was provided from multiplexer 48. Should the R register 44 output bit value be a "0" bit, multiplexer 50 would output the QC16 data.

The multiplexing scheme as illustrated in FIG. 2 utilizes the block assignments to multiplex coefficient sub-blocks QC2, QC4, QC8, QC16 values into a composite block of DCT coefficients QC. In essence this step is accomplished by three stages. The first stage conditionally replaces a 4×4 block of QC4 with four 2×2 sub-blocks according to the content of the P register. The second stage conditionally replaces an 8×8 block of QC8 by four 4×4 sub-blocks as resulting from the previous stage according to the content of the Q register. The third stage conditionally replaces the 16×16 block of QC16 with the result of the previous stages if the R register contains a "1" bit.

Figure 3A:
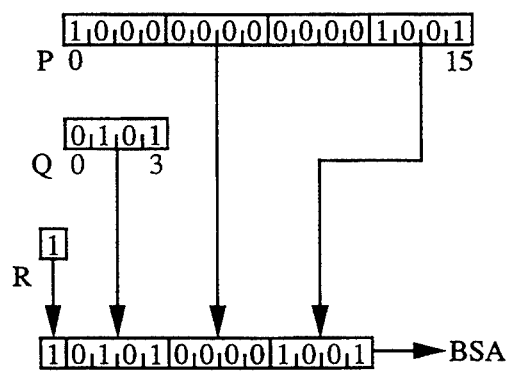
FIGS. 3a and 3b respectively illustrate exemplarily register block size assignment data and the block selection tree corresponding thereto.
Figure 3B:
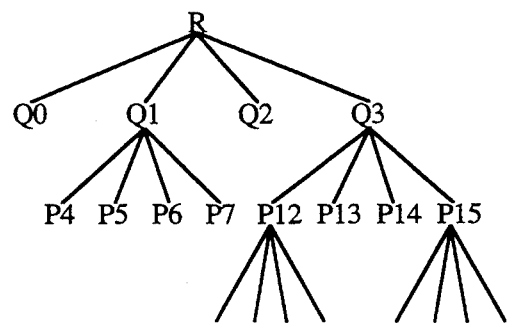

FIGS. 3a and 3b respectively illustrate the exemplary P, Q and R register data and corresponding and BSA bit pattern, and the corresponding inverted quadtree corresponding thereto. The level of hierarchy involved is that should the bit stored in the R register be a "1", a condition exists which is indicative that the image block may be more efficiently coded using smaller blocks. Similarly, should the Q register contain any "1" bits it further indicates that the corresponding 8×8 block may be more efficiently coded by smaller blocks. Similarly, should the P register contain any "1" bits it further indicates that the corresponding 4×4 block may be more efficiently coded using four 2×2 blocks. Should any of the registers contain a "0" bit, this indicates that the block or sub-block may be coded more efficiently by using the size block related thereto.

For example, the value of the bit in the P register bit 0 position, a "1" bit, indicates that this 4×4 block may be more efficiently coded using four 2×2 blocks, while the "0" bits in the P register bit positions indicate that the three 4×4 are more efficiently coded using corresponding 2×2 blocks. However, the bit value "0" in the Q register indicates that the four 4×4 blocks, comprised of one group of four 2×2 blocks and three 4×4 blocks, may be more efficiently coded by a single 8×8 block. Therefore, the Q register data would override the P register data. Once the P register data was overridden by the Q register 0 position bit, data in the P register bit positions 0-3, need not be transmitted as part of the block size assignment (BSA) data. However, should a bit position in a higher register be a "1" bit, such as bit position 1 of the Q register, the corresponding P register bits are provided as part of the BSA data. As illustrated in FIG. 3a, the Q register bit position 1 is a "1" bit and therefore the corresponding P register bits 4–7 are provided in the BSA data. On a higher level, since the R register bit is a "1" bit each of the Q register bits are provided in the BSA data.

Returning to FIG. 2, the composite block QC contains many zero coefficient values which can be more efficiently coded by run-length codes. The number of consecutive zeros or runs are sent instead of the code words for each zero. In order to maximize the efficiency of the run-length coding, the coefficients are ordered in a predetermined manner such that the occurrence of short runs is minimized. Minimization is done by encoding the coefficients which are likely to be non-zeros first, and then encoding the coefficients that are more likely to be zeros last. Because of the energy compaction property of DCT towards low frequency, and because diagonal details occur less often than horizontal or vertical details, diagonal scan or zig-zag scan of the coefficients is preferred. However, because of the variable block sizes used, the zig-zag scan has to be modified to pick out the low frequency components from each sub-block first, but at the same time follow the diagonal scanning for coefficients of similar frequency, technically when the sum of the two frequency indices are the same.

Figure 4A:
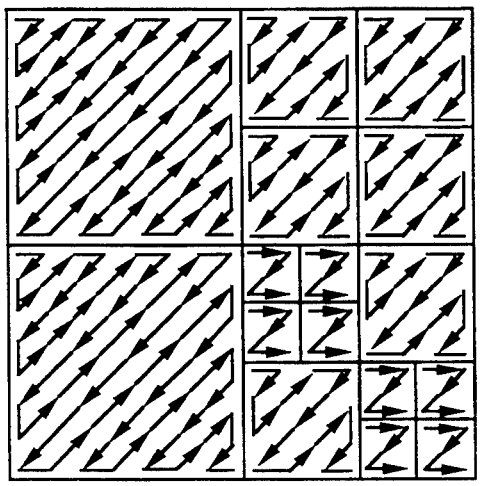
Figure 4B:
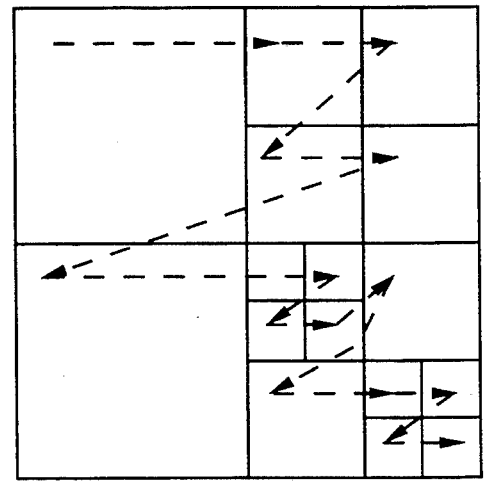
Figure 5A:
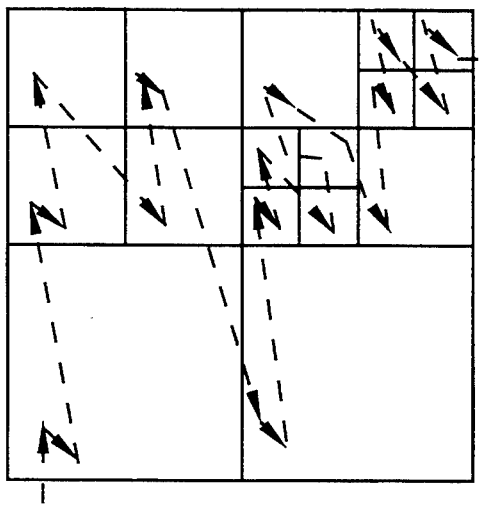
FIGS. 5a-5d respectively illustrate in graphical form an alternate zig-zag scan serialization format.
Figure 5B:
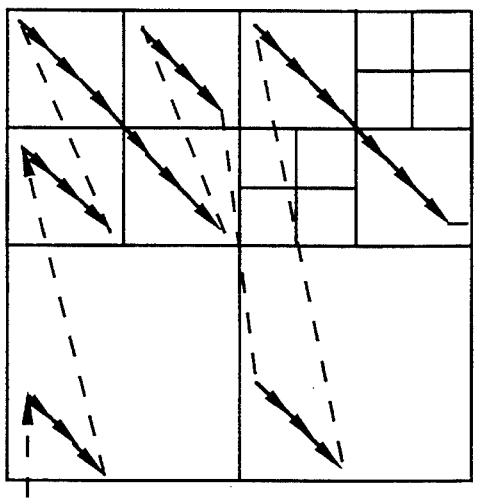
Figure 5C:
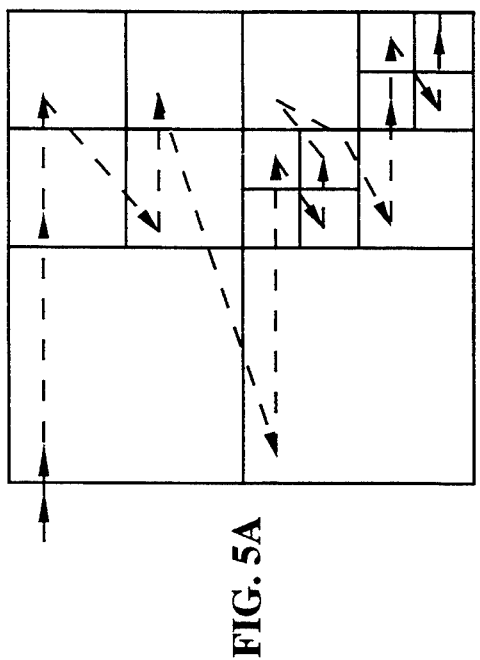
Figure 5D:
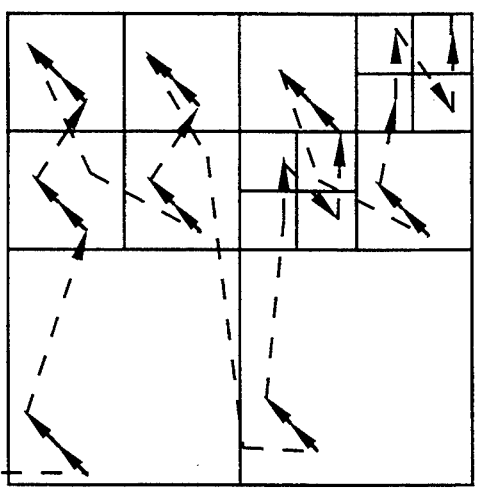

Accordingly, the output composite block QC from multiplexer 50 is input to zig-zag scan serializer 52 along with the BSA data (P, Q and R). FIG. 4a illustrates the zig-zag ordering of the block data within blocks and corresponding sub-blocks. FIG. 4b illustrates the ordering in the serialization between blocks and sub-blocks as determined by the BSA data.

The output of zig-zag scan serializer 52, comprised of the ordered 256 quantized DCT coefficients of the composite block QC, is input to coefficient buffer 54 where they are stored for run-length coding. The serialized coefficients are output from coefficient buffer 54 to run-length coder 56 where run-length coding is preformed to separate out the zeros from the non-zero coefficients. Run-length as well as the non-zero coefficient values are separately provided to corresponding lookup tables. The run-length values are output from run-length coder 56 as an input of run-length code lookup table 58 where the values are Huffman coded. Similarly, the non-zero coefficient values are output from run-length coder 56 as an input to non-zero code lookup table 60 where the values are also Huffman coded. Although not illustrated it is further envisioned that run-length and non-zero code look up tables may be provided for each block size.

The Huffman run-length coded values along with the Huffman non-zero coded values are respectively output from run-length lookup code table 58 and non-zero code lookup table 60 as inputs to bit field assembler 62. An additional input to bit field assembler 62 is the BSA data from the P, Q and R registers. Bit field assembler 62 disregards the unnecessary bits provided from the P, Q and R registers. Bit field assembler 62 assembles the input data with BSA data followed by the combined RL codes and NZ codes. The combined data is output from bit field assembler 62 to a transmit buffer 64 which temporarily stores the data for transfer to the transmitter (not shown).

When the DQT subsystem is employed the coded DC DCT coefficients are omitted from transfer to transmit buffer 64. Instead the DQT coefficients provided by the DQT subsystem, as an input to bit field assembler 62, are transmitted. The formatting of data in this embodiment is typically a data packet comprised in sequence of sync, BSA, DQT and DCT data bits. Furthermore, the packet may also include end of block code bits following the DCT bits.

FIGS. 5a–5d illustrates an alternate scan and serialization format for the zig-zag scan serializer 52. In FIGS. 5a–5d, the quantized DCT coefficients are mapped into a one-dimensional string by ordering from low frequency to high frequency. However in the scheme illustrated in FIGS. 5a–5d the lower order frequencies are taken from each block prior to taking the next higher frequencies in the block. Should all coefficients in a block be ordered, during the previous scan, the block is skipped with priority given to the next block in the scan pattern. Block to block scanning, as was done with the scanning of FIGS. 4a–4c is a left-to-right, up to down scan priority.

As previously mentioned the present invention implements a new and previously undisclosed transform identified herein as the differential quadtree transform (DQT). The basis for this transform is the recursive application of the 2×2 DCT on a quadtree representation of the sub-blocks. At the bottom of the inverted quadtree, for example the quadtree illustrated in FIG. 3b, the 2×2 DCT operation is performed and the node is assigned the DC value of the 2×2 DCT transform. The nearest nodes are gathered and another 2×2 DCT is performed. The process is repeated until a DC value is assigned to the root. Only the DC value at the root is coded at a fixed number of bits, typically 8-bits, while the rest are Huffman coded. Because each 2×2 DCT operation is nothing more than a sum and a difference of numbers, no multiplications are required, and all coefficients in the quadtree, except DC, represent the differences of two sums, hence the name DQT. Theoretically this type of transform cannot exceed the performance of 16×16 DCT coding. However the implementation of the DQT transform has the advantage of requiring seemingly simple hardware in addition to naturally implementing the adaptive block size coding. Furthermore the quadtree structure allows the coding of the zero coefficients by simply indicating the absence of a subtree when all sub-blocks under the subtree contain only zeros.

Figure 6:
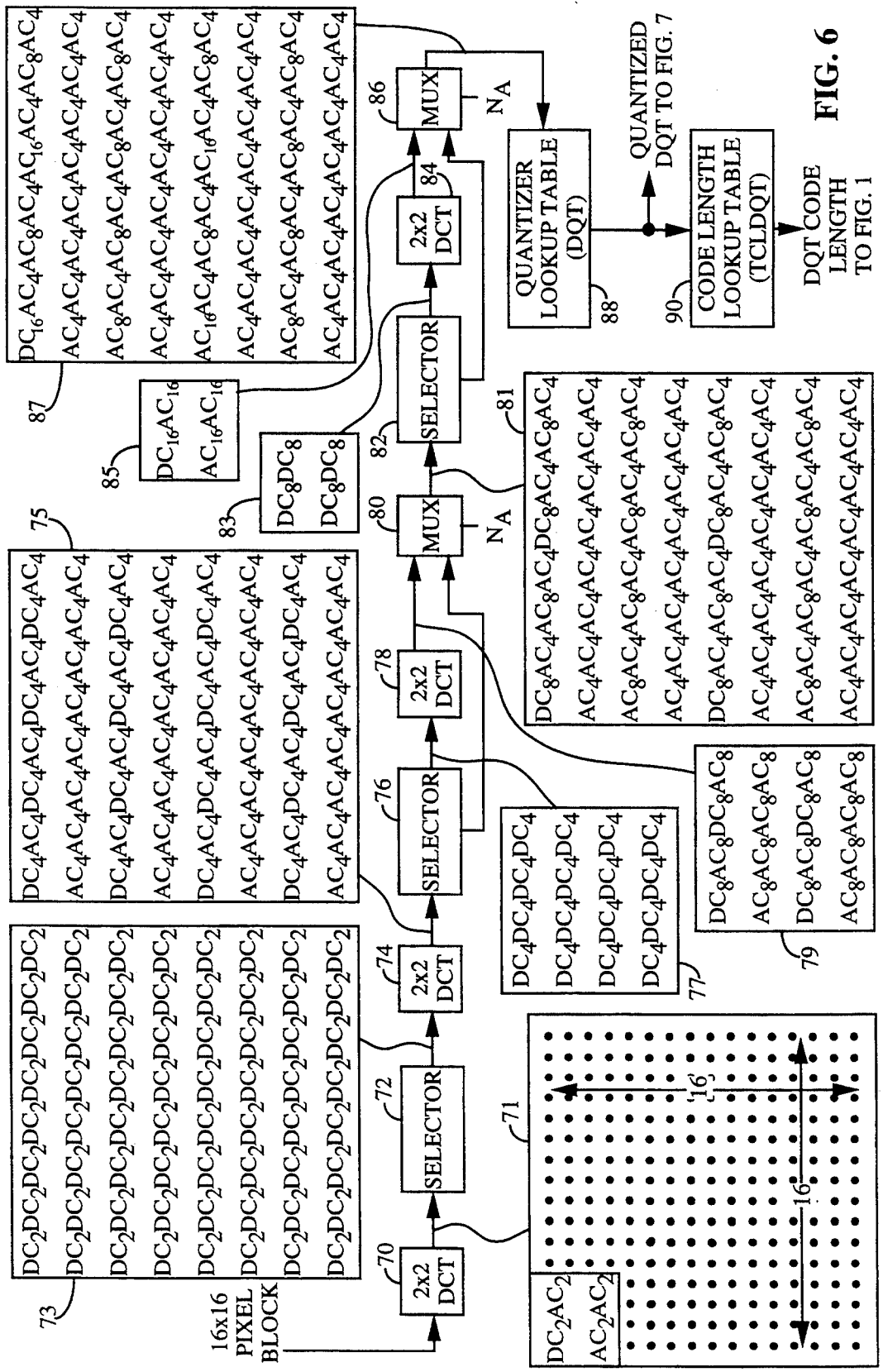
FIG. 6 is a block diagram illustrating the DQT coefficient processing elements of the DQT subsystem of the present invention used in accompaniment with the image compression system of FIGS. 1 and 2.

FIG. 6 illustrates an exemplary implementation of a DQT subsystem. In FIG. 6, the same 16×16 block of pixel data is received as that of the subsystem of FIGS. 1 and 2 such that the DQT processing is accomplished in parallel to the adaptive block size data processing. The input block of pixel data is provided to 2×2 DCT element 70 which performs sixty-four 2×2 two-dimensional DCT operations on data. The output of DCT element 70 is comprised of a 16×16 block of DCT coefficients, block 71. For each 2×2 block of pixel data processed by DCT element 70, the corresponding output is comprised of one DC DCT coefficient ($DC_2$) and three AC coefficients ($AC_2$).

The 16×16 block of DCT coefficients output from DCT element 70 is provided to selector 72. Selector 72 removes the AC DCT coefficients from the input block of DCT coefficients and provides an output 8×8 block of comprised of DC DCT coefficients ($DC_2$) only. The 8×8 block of DC DCT coefficients ($DC_2$), block 73, is provided to 2×2 DCT element 74.

DCT element 74 performs sixteen 2×2 two-dimensional DCT operations on the input block of DC DCT coefficients ($DC_2$). The output of DCT element 74 is comprised of an 8×8 block of DCT coefficients. For each 2×2 block of DC DCT coefficients ($DC_2$) processed by DCT element 74, the corresponding output is comprised of one DC DCT coefficient ($DC_4$) and three AC DCT coefficients ($AC_4$). As illustrated in FIG. 6, the circled DC DCT coefficients ($DC_4$) and AC DCT coefficients ($AC_4$) in block 75 replace a corresponding DC DCT coefficients ($DC_2$) in the 8×8 block, block 73, arrangement as output from selector 72.

The 8×8 block of DCT coefficients output from DCT element 74 is provided to selector 76. Selector 76 provides the AC DCT coefficients ($AC_4$) from the input block of DCT coefficients as an input to multiplexer 80 while providing the DC DCT coefficients ($DC_4$) as four 2×2 blocks of DC DCT coefficients ($DC_4$), block 77, to 2×2 DCT element 78.

DCT element 78 performs four 2×2 two-dimensional DCT operations on the input block of DC DCT coefficients ($DC_4$). The output of DCT element 78 is comprised of an 4×4 block of DCT coefficients, block 79. For each of the four 2×2 blocks of DC DCT coefficients ($DC_4$) processed by DCT element 78, the corresponding output is comprised of one DC DCT coefficient ($DC_8$) and three AC DCT coefficients ($AC_8$). The output DC DCT coefficient ($DC_8$) and AC DCT coefficients ($AC_8$) are provided as another input to multiplexer 80.

Multiplexer 80 normally provides an output of the AC DCT coefficients ($AC_4$) from DCT element 74 (via separator 76). Multiplexer 80 is responsive to a control signal $N_a$ for providing the DC DCT coefficient ($DC_8$) and the AC coefficients ($AC_8$) from DCT element 78. Multiplexer 80 creates a composite 8×8 block of DC and AC DCT coefficients, block 81. Block 81 is identical in arrangement with respect to the AC DCT coefficients ($AC_4$) as output from DCT element 74 in block 75. However in block 81 the DC DCT coefficients ($DC_8$) and AC DCT coefficients ($AC_8$) replace the DC DCT coefficients ($DC_4$) in block 75 as it was output from DCT element 74. As illustrated in FIG. 6, the circled DC DCT coefficients ($DC_8$) and AC DCT coefficients ($AC_8$) in block 81 replace a corresponding DC DCT coefficients ($DC_4$) in the 8×8 block arrangement of block 75. In block 81 since there is only one DC coefficient for every fifteen AC coefficients, the composite block is considered as four 4×4 blocks.

The four 4×4 blocks of DCT coefficients output from Multiplexer 80 is provided to selector 82. Selector 82 provides the AC DCT coefficients ($AC_4$) and ($AC_8$) from the input block of DCT coefficients as an input to multiplexer 86 while providing the DC DCT coefficients ($DC_8$) as a 2×2 block of DC DCT coefficients ($DC_4$), block 83, to 2×2 DCT element 84.

DCT element 84 performs a 2×2 two-dimensional DCT operations on the input block of DC DCT coefficients ($DC_8$). The output of DCT element 78 is comprised of a 2×2 block of DCT coefficients, block 85. For the 2×2 block of DC DCT coefficients ($DC_4$) processed by DCT element 84, the output is comprised of one DC DCT coefficient ($DC_{16}$) and three AC DCT coefficients ($AC_{16}$). The output DC DCT coefficient ($DC_{16}$) and AC DCT coefficients ($AC_{16}$) are provided as another input to multiplexer 86.

Multiplexer 86 normally provides an output of the AC DCT coefficients ($AC_4$) and ($AC_8$) from multiplexer 80 (via separator 82). Multiplexer 86 is responsive to a control signal $N_b$ for providing the DC DCT coefficient ($DC_{16}$) and the AC coefficients ($AC_{16}$) from DCT element 84. Multiplexer 86 creates a composite 8×8 block of DC and AC DCT coefficients, block 87. Block 87 is identical in arrangement with respect to the AC DCT coefficients ($AC_4$) and ($AC_8$) as output from multiplexer 80 in block 81. However in the block 87 the DC DCT coefficient ($DC_{16}$) and AC DCT coefficients ($AC_{16}$) replace the DC DCT coefficients ($DC_8$) in block 81 as output from multiplexer 80. As illustrated in FIG. 6, the circled DC DCT coefficient ($DC_{16}$) and AC DCT coefficients ($AC_{16}$) in block 87 replace a corresponding DC DCT coefficients ($DC_8$) in the 8×8 block arrangement of block 81. In block 87 since there is only one DC coefficient for every fifteen AC coefficients, the composite block is considered as one 8×8 block.

The 8×8 block, block 87, output from multiplexer 86 is comprised of what are considered Discrete Quadtree Transform (DQT) coefficients. The DQT coefficients are then quantized by providing the coefficient values to quantizer look table 88.

Quantizer lookup table 88 may also be implemented in conventional read only memory (ROM) form with memory locations containing quantization values. The value of each transform coefficient is used to address a corresponding memory location to provide an output data signal indicative of a corresponding quantized transform coefficient value. The output of quantizer lookup table 88, indicated by the reference signal QC16, is an 8×8 block of quantized DQT coefficient values. Although not illustrated, again the DC coefficient ($DC_{16}$) of the DQT transform operation may be optionally treated separately rather than through the corresponding quantizer lookup table.

The DQT coefficients are provided as an output of quantizer lookup table 88 to code length lookup table 90. The quantized DQT coefficient values are each coded using variable length code, such as a Huffman code, in order to minimize the data rate. Code words and corresponding code lengths are found in the form of code length look up table 90. Each of the quantized DQT coefficients $DC_{16}$, $AC_{16}$, $AC_8$ and $AC_4$, are used to look up in the code length table the corresponding number of bits required to code each coefficient. Code length lookup table 90 may also be implemented in read only memory form with the DQT coefficients addressing memory locations which contain respective code length values. The DQT coefficient code length values are provided to multiplexers 15a–15d of FIG. 1 for replacing the corresponding DC DCT coefficient code length value for each block and sub-block in the block size determination as was discussed with reference to FIGS. 1 and 2.

Figure 7:
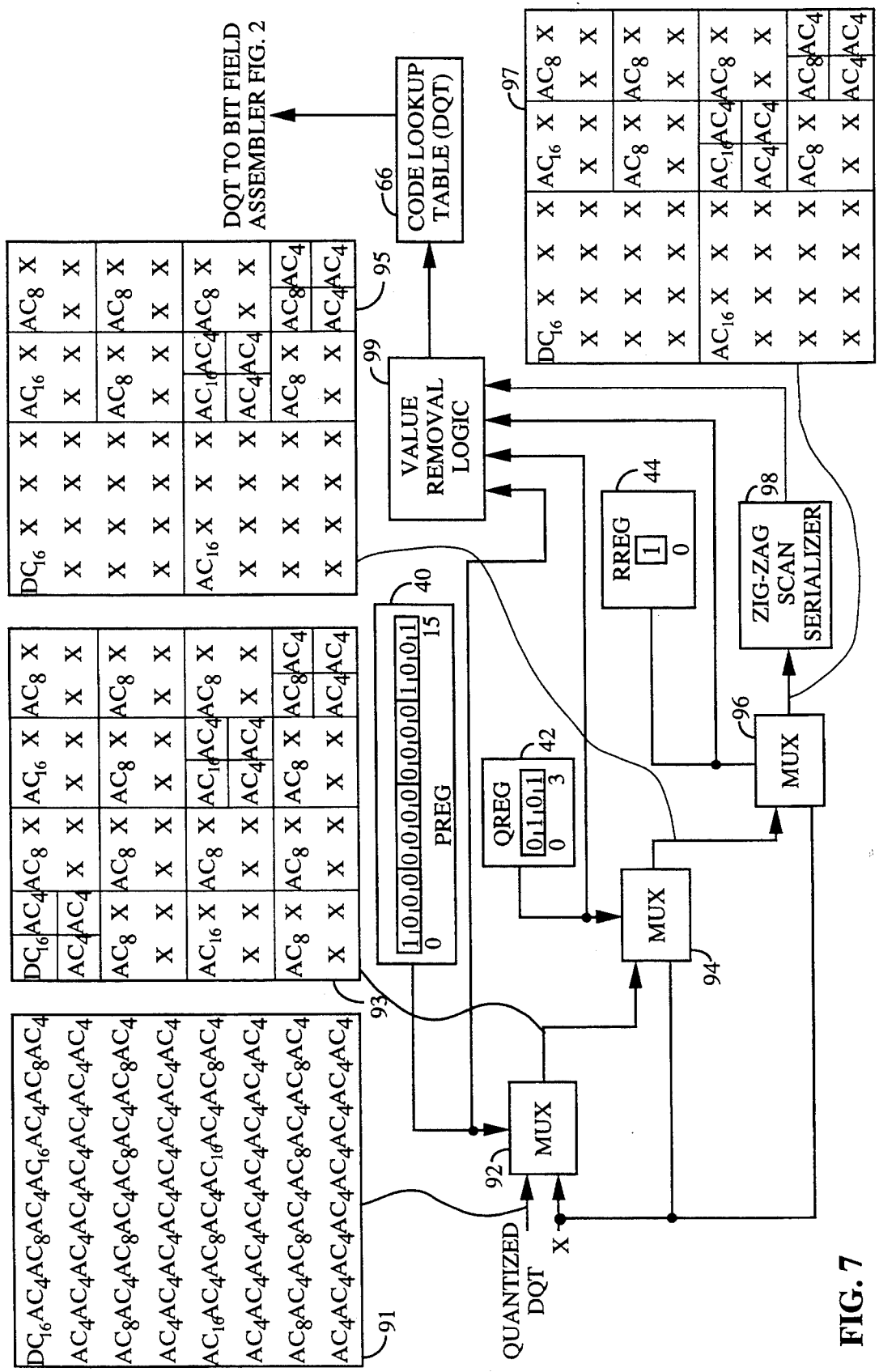
FIG. 7 is a block diagram further illustrating the DQT coefficient block replacement processing elements of the DQT subsystem of the present invention used in accompaniment with the image compression system of FIGS. 1, 2 and 6

In FIG. 7 the 64 quantized DQT coefficient values of block 91 are selected for replacement of the DC DCT coefficient values for the block sizes as determined by the block size determination made in accordance as discussed with reference to FIGS. 1 and 2. The values stored in P, Q and R registers 40, 42 and 44 are used in selecting the DQT coefficient values for replacement in the block and sub-blocks of the DC DCT coefficient values.

The DQT coefficient values are provided from quantizer lookup table 88 (FIG. 6) to one input to multiplexer 92. At the other input of multiplexer 92 a dummy value x is provided. Multiplexer 92 is responsive to the bits of P register 40 for providing an output of the DQT coefficient values for the entire 2×2 sub-block when a "1" is in the P register 40 bit position. When the value in P register 40 bit position is a "0", only the DQT coefficient value which corresponds to the DC coefficient value of the sub-block is output with the remaining values output being the dummy values x. The value x is used merely to maintain the arrangement within the sub-block with these values eventually discarded. Using the data in the sixteen bit position of P register 40 as provided in the example as given with reference to FIGS. 1 and 2, composite block 93 is formed.

The sub-blocks of DQT coefficients and dummy values x output from multiplexer 92 are provided as one input to multiplexer 94. At the other input of multiplexer 94 the dummy value x is again provided. Multiplexer 94 is responsive to the bits of Q register 42 for providing an output of the DQT coefficient values and dummy values x for an entire 4×4 sub-block as provided from multiplexer 92 when a "1" is in the Q register 42 bit position. When the value in Q register 42 bit position is a "0", only the DQT coefficient value which corresponds to the DC coefficient value of the sub-block is output with the remaining values output being the dummy values x. The value x is again used merely to maintain the arrangement within the sub-block with these values eventually discarded. Using the data in the four bit positions of Q register 42 as provided in the example as given with reference to FIGS. 1 and 2, composite block 95 is formed.

The sub-blocks of DQT coefficients and dummy values x output from multiplexer 94 are provided as one input to multiplexer 96. At the other input of multiplexer 96 the dummy value x is again provided. Multiplexer 96 is responsive to the bits of R register 44 for providing an output of the DQT coefficient values and dummy values x for an entire 16×16 block as provided from multiplexer 94 when a "1" is in the R register 44 single bit position 0. When the value in R register 42 bit position 0 is a "0", only the DQT coefficient value which corresponds to the DC coefficient value of the block is output with the remaining values output being the dummy values x. The value x is again used merely to maintain the arrangement within the block with these values eventually discarded. Using the data in single bit position of R register 44 as provided in the example as given with reference to FIGS. 1 and 2, composite block 97 is formed.

A comparison of block 97 with the representative block for the values QC of FIG. 2 reveals that for each 8×8 DCT coefficient block of QC to be encoded a single DQT coefficient value exists. Similarly for each 4×4 and 2×2 DCT coefficient block of QC to be encoded a single DQT coefficient value exists. Although in the example given the block was not encoded as a 16×16 block had this been the case a single DQT value would have been generated in the composite block.

The DQT coefficient values are output from multiplexer 96 to zig-zag scan serializer which arranges the DQT coefficients and dummy values x in a manner that was discussed with reference to FIGS. 4a and 4b. The zig-zag scan serialized data is provided to value removal logic 99 which removes the dummy values x using information identifying the position of the dummy values x based upon the P, Q and R register data. It should be understood that the use of the dummy values x may be eliminated using a more elaborate multiplexing scheme.

The DQT coefficient values output from logic 99 is provided to code lookup table 66 the values are coded also preferably using a Huffman code. The coded DQT coefficient values are output from code lookup table 66 to bit field assembler 62 of FIG. 2. Bit field assembler 62 as previously discussed in arranging the data for transmission provides the coded DQT coefficients along with the coded AC DCT coefficients, while removing the coded DC DCT coefficients from the data output.

Figure 8:
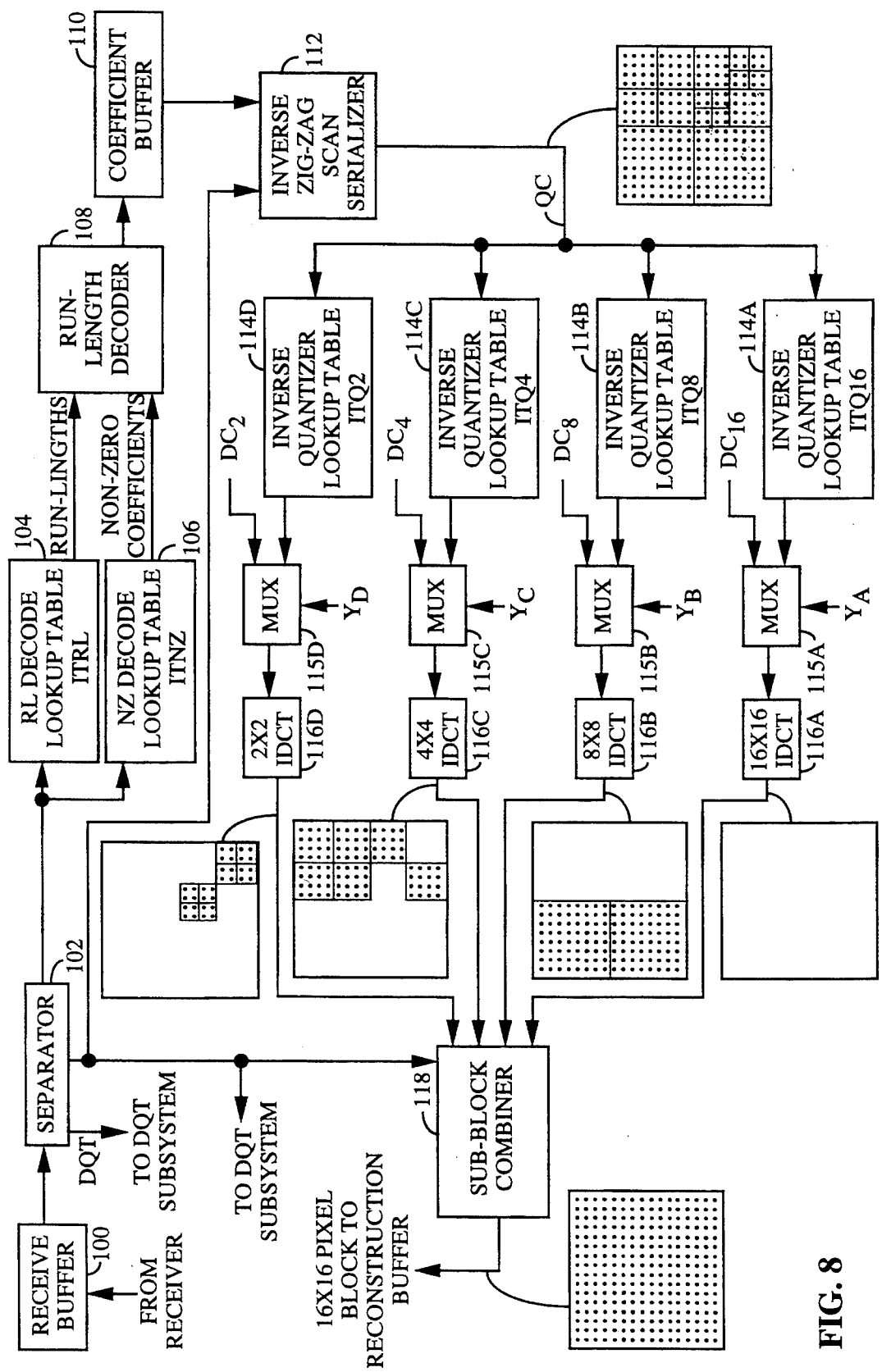
FIG. 8 is a block diagram illustrating a decoder for reconstructing an image from a received signal generated by the processing elements of FIGS. 1 and 2.

FIG. 8 illustrates the implementation of a receiver for decoding the compressed image signal generated according to the parameters of FIGS. 1 and 2. In FIG. 8, the coded word is output from the receiver (not shown) to a receive buffer 100. Receive buffer 100 provides an output of the code word to separator 102. Received code words include by their nature the BSA data, the DQT coded coefficients, and the coded DCT coefficients in the form of the RL codes and NZ codes. All received code words obey the prefix conditions such that the length of each code word need not be known to separate and decode the code words.

Separator 102 separates the BSA codes from the the DQT coded coefficients and the coded DCT coefficients since the BSA codes are transmitted and received first before this data. The first received bit is loaded into an internal R register (not shown) similar to that of FIG. 2. An examination of the R register determines that if the bit is a "0", the BSA code is only one bit long. Separator 102 also includes Q and P registers that are initially filled with zeros. If the R register contains a "1" bit, four more bits are taken from the receive buffer and loaded into the Q register. Now for every "1" bit in the Q register, four more bits are taken from the receive buffer and loaded into the P register. For every "0" in the Q register, nothing is taken from the receive buffer but four "0" are loaded into the P register. Therefore, the possible lengths of the BSA code is 1, 5, 9, 13, 17 and 21 bits. The decoded BSA data is output from separator 102.

Separator 102 also separates the the DQT coded coefficients from the coded DCT coefficients. Separator 102 outputs the DQT coded coefficients to the DQT decoder subsystem illustrated in further detail in FIG. 9.

Separator 102 also outputs the coded DCT coefficients in the form of RL codes and NZ codes respectively to RL decode lookup table 104 and NZ decode lookup table 106. Lookup tables 104 and 106 are essentially inverse lookup tables with respect to lookup tables 58 and 60 of FIG. 2. The output of lookup table 104 are values corresponding to run-length and are input to run-length decoder 108.

Similarly the non-zero coefficient values output from lookup table 106 are also input to run-length decoder 108. Run-length decoder 108 inserts the zeros into the decoded coefficients and provides an output to coefficient buffer 110 which temporarily stores the coefficients. The stored coefficients are output to inverse zig-zag scan serializer 112 which orders the coefficients according to the scan scheme employed. Inverse zig-zag scan serializer 112 receives the BSA signal from separator 102 to assist in proper ordering of the block and sub-block coefficients into a composite coefficient block. The block of coefficient data is output from inverse zig-zag scan serializer 112 and respectively applied to a corresponding inverse quantizer lookup table 114a–114d.

In each of inverse quantizer lookup tables 114a–114d an inverse quantizer value is applied to each coefficient to undo the quantization. Inverse quantizer lookup tables 114a–114d may be employed as ROM devices which contain the quantization factors from that of quantizer lookup tables 12a–12d. The coefficients are output from each of inverse quantizer lookup tables 114a–114d to a corresponding input of multiplexers 115a–115d.

Figure 9:
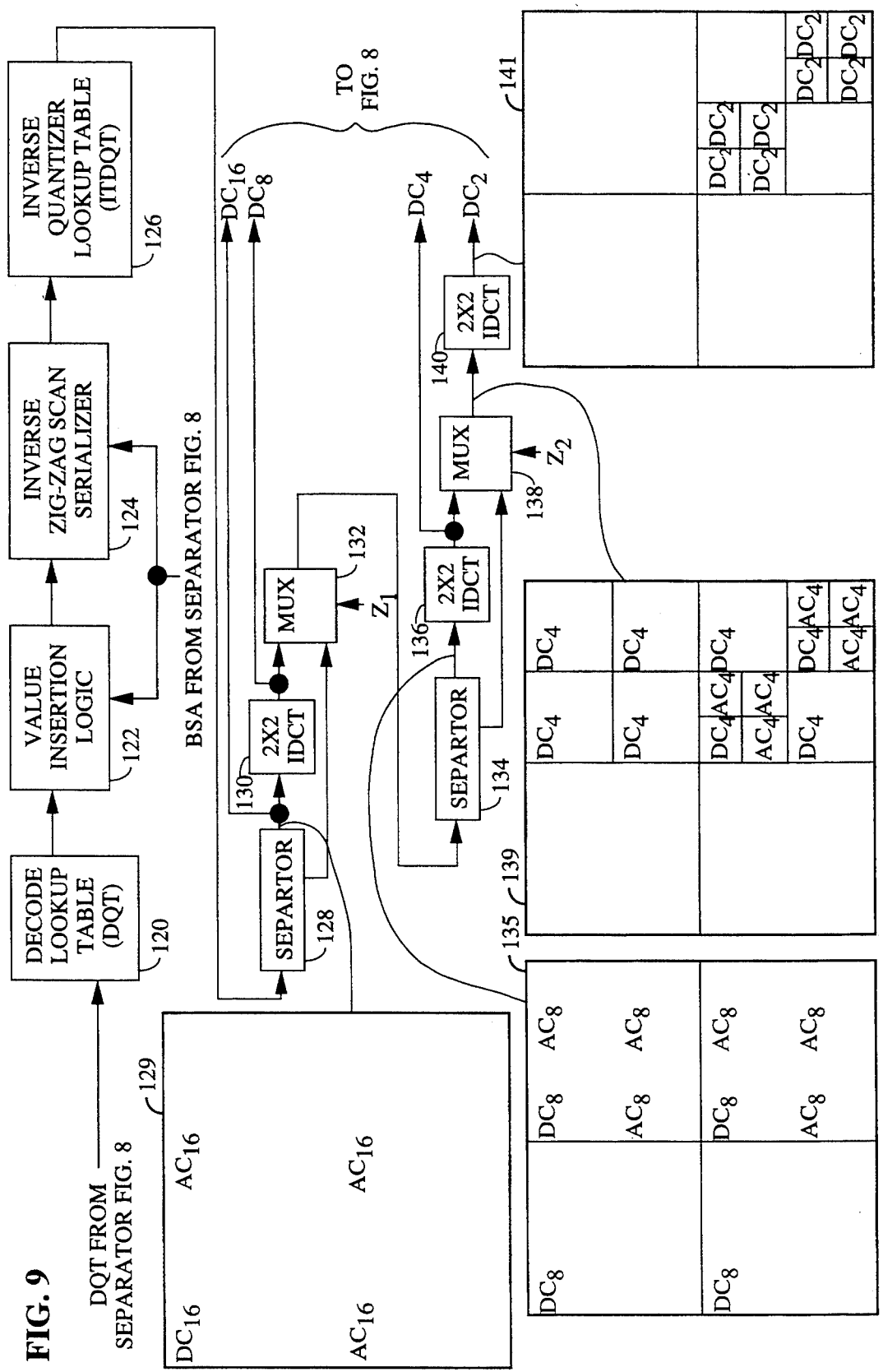
FIG. 9 is block diagram illustrating the DQT subsystem of the present invention used in accompaniment with the decoder of FIG. 7.

The other input of each of multiplexers 115a–115d is coupled to the DQT decoder subsystem of FIG. 9. Multiplexers 115a–115d are each responsive to a respective control signal $Y_a$–$Y_d$ for providing an output of the AC DCT coefficient values provided from inverse quantizer lookup tables 114a–114d and the DQT coefficients values, which replace the DC DCT coefficient values. The DQT/DCT coefficients are output respectively from multiplexers 115a–115d to inverse discrete cosine transform (IDCT) elements 116a–116d.

IDCT element 116a forms from the 16×16 coefficient block, if present, a 16×16 pixel data block which is then output to sub-block combiner 118. Similarly, DCT 116b transforms respective 8×8 blocks of coefficients, if present, to 8×8 blocks of pixel data. The output of IDCT element 116b is provided to sub-block combiner 118. IDCT elements 116c and 116d respective transform the 4×4 and 2×2 coefficient blocks, if present, to corresponding pixel data blocks which are provided to sub-block combiner 118. Sub-block combiner 118 in addition to receiving the outputs from IDCT elements 116a–116d also receives the BSA data from separator 102 so as to reconstruct the blocks of pixel data into a single 16×16 pixel block. The reconstructed 16×16 pixel block is output to a reconstruction buffer (not shown) for ultimate transfer to the display system.

FIG. 9 illustrated in further detail the structure of the DQT decoder subsystem wherein separator 102 provides the coded DQT coefficients to decode lookup table 120. Lookup table 120 is essentially an inverse lookup table with respect to lookup table 66 of FIG. 7, and as such is a Huffman decoder lookup table. The output of lookup table 120 are values corresponding to the decoded DQT coefficients and are input to value insertion logic 122. Logic 122 also receives the BSA data which is in essence the values for the P, Q, and R registers. Logic 122 reconstructs the block/sub-blocks with the DQT data and dummy values x to produce a composite serialized block of DQT and dummy values corresponding to a zig-zag scan serialized version of block 97 of FIG. 7.

The DQT coefficients and dummy values are output from logic 122 to inverse zig-zag scan serializer 124 which orders the coefficients according to the scan scheme employed. Inverse zig-zag scan serializer 124 also receives the BSA signal from separator 102 to assist in proper ordering of the block and sub-block coefficients into a composite coefficient block identical to that of block 97 of FIG. 7. The block of coefficient data is output from inverse zig-zag scan serializer 124 to inverse quantizer lookup table 126.

In inverse quantizer lookup table 126 an inverse quantizer value is applied to each coefficient to undo the quantization. Inverse quantizer lookup table 126 may also be employed as a ROM device which contain the quantization factors from that of quantizer lookup table 88. The coefficients are output from each of inverse quantizer lookup tables 126 to separator 128. Separator 128 provides the DC DQT coefficient ($DC_{16}$), along with the AC DQT coefficients ($AC_{16}$), to multiplexer 115a. IDCT element 116a therefore receives the DC DQT coefficient ($DC_{16}$) via multiplexer 115a. It should be noted that although these values are sent to multiplexer 115a, the AC coefficients ($AC_{16}$) are not output from the multiplexer. With respect to the DC coefficient ($DC_{16}$) this value is output from the multiplexer but may ultimately be disregarded should it belong to a block size which is not selected according to the block size assignment. In an alternate embodiment the ultimate unused value may not be sent to multiplexer 115a or inhibited thereat using the BSA data. In FIG. 7 this value is not graphically illustrated as an input to sub-block combiner 118.

Separator 128 also provides the DC and AC DQT coefficients ($DC_{16}$) and ($AC_{16}$) to 2×2 inverse discrete cosine transform (IDCT) element 130 while providing all of the other values of the 8×8 composite block as an input to multiplexer 132. Illustrated in block 129 are the relevant values provided to IDCT element 130.

IDCT element 130 performs one 2×2 inverse discrete cosine transform on the 2×2 block comprised of one DC and three AC DQT coefficients, ($DC_{16}$) and ($AC_{16}$'s), so as to produce four resultant DC DQT coefficients ($DC_8$) which are provided as an input to multiplexer 132. The DC DQT coefficients ($DC_8$) are also provided to multiplexer 115b. In the example provided, two of the DC DQT coefficients ($DC_8$), circled in block 135, are used in the final block data in place of the DC DCT coefficient that was not sent. As was discussed with reference to the values provided to multiplexer 115a, in the present example the other two of these values are also unused in the final block assignment data. In FIG. 7 these unused computation values are not graphically illustrated as an input to sub-block combiner 118.

Multiplexer 132 provides all of the values from separator 128 as an output to separator 134. Multiplexer 132 also receives the DC DQT coefficient values ($DC_8$) from IDCT element 130 and in response to a control signal $Z_1$ the DC DQT coefficients ($DC_8$) are output to separator 134 at the corresponding place in the composite block for the DC and AC DQT coefficients, ($DC_{16}$) and ($AC_{16}$).

Separator 134 provides the DC and AC DQT coefficients ($DC_8$) and ($AC_8$) to 2×2 inverse discrete cosine transform (IDCT) element 136 while providing all of the other values of the 8×8 composite block as an input to multiplexer 138. Illustrated in block 135 are the relevant values provided to IDCT element 136.

IDCT element 136 performs four 2×2 inverse discrete cosine transform on each of the four 2×2 blocks of comprised of one DC and three AC DQT coefficients, ($DC_8$) and ($AC_8$'s) so as to produce sixteen resultant DC DQT coefficients ($DC_4$) which are provided as an input to multiplexers 138 and 115c. In the provided example the IDCT computation is performed in each of the two left hand side sub-blocks of block 135 using the DC DQT coefficient ($DC_8$) and three dummy values for the three AC DQT coefficients ($AC_8$). Since the result of the IDCT computations using dummy values is not an actual DC DQT coefficient these values may be transmitted to multiplexer 115c but will remain unused.

The DC DQT coefficients ($DC_4$) are as output from IDCT element 136 provided to multiplexer 115c. Again for the example provided, six of the eight DC DQT coefficients ($DC_4$), circled in block 139, are used in the final block data in place of the DC DCT coefficient that was not sent. As was discussed with reference to the values provided to multiplexers 115a and 115b, in the present example, the other two of these values are also unused in the final block assignment data. In FIG. 7 these unused values along with the dummy value computation results are not graphically illustrated as an input to sub-block combiner 118.

Multiplexer 138 provides the values output from separator 134 as an input to 2×2 inverse discrete cosine transform (IDCT) element 140. Multiplexer 138 also receives the DC DQT coefficient values ($DC_4$) from IDCT element 136 and in response to a control signal $Z_2$ the DC DQT coefficients ($DC_4$) are output to IDCT element 140 at the corresponding place in the composite block for the DC and AC DQT coefficients, ($DC_8$) and ($AC_8$). Illustrated in block portion 141 are the relevant values provided to IDCT element 140.

IDCT element 140 performs sixteen 2×2 inverse discrete cosine transform on the 2×2 blocks each comprised of one DC and three AC DQT coefficients, ($DC_4$) and ($AC_4$'s), so as to produce sixty-four resultant DC DQT coefficients ($DC_2$) which are provided as an input to multiplexer 115d. In the provided example the IDCT computation is performed in each coefficient sub-block in block 139 including those without AC DQT coefficients ($AC_4$) by using three dummy values for the three AC DQT coefficients ($AC_4$). Since the result of the IDCT computations using dummy values is not an actual DC DQT coefficient these values may be transmitted to multiplexer 115d but will remain unused.

Again for the example provided, eight of the sixty-four DC DQT coefficients ($DC_2$), circled in block 141, are used in the final block data in place of the DC DCT coefficient that was not sent. As was discussed with reference to the values provided to multiplexer 115a and 115b, in the present example, the other two of these values are also unused in the final block assignment data. In FIG. 7 these unused values along with the dummy value computation results are not graphically illustrated as an input to sub-block combiner 118.

As was discussed with reference to FIG. 8, the DQT coefficients which were transmitted as replacements for the omitted DC DCT coefficients are used as the DC coefficient for each relevant block size. The DQT implementation is readily adaptable to the adaptive block size image compression scheme as disclosed herein. The DQT subsystem reduces the data rate by providing a reduction in bits that need to be sent. Furthermore, a DQT subsystem implementation has no effect on the number of overhead bits in the adaptive block size image compression scheme. In fact the use of the DQT processing scheme results in a reduction in the number of bits that need be transmitted for those cases in where the number of smaller blocks is great.

Figure 10:
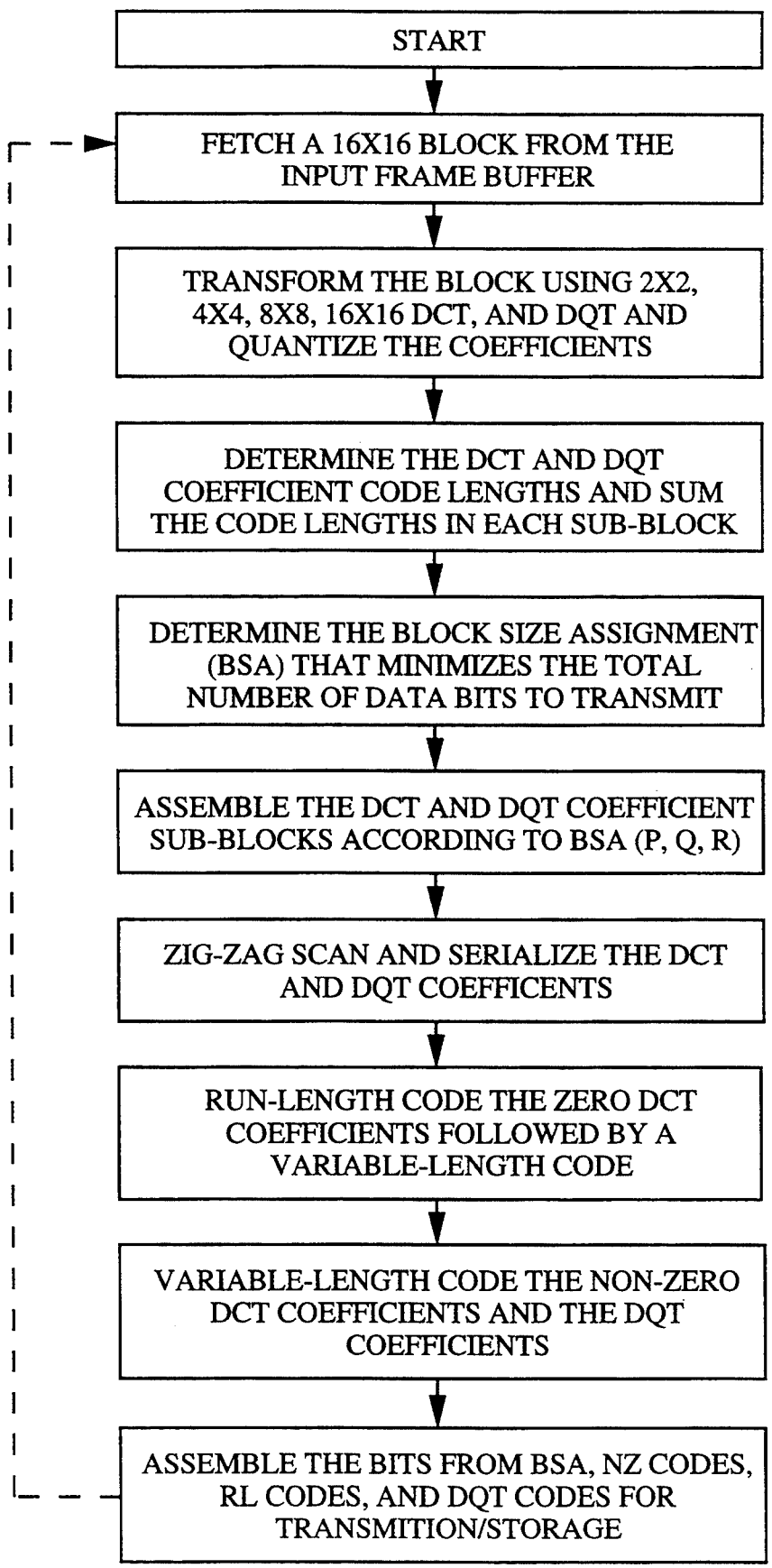
FIG. 10 is a flow chart illustrating the processing steps involved in compressing and coding image data as performed by the processing elements of FIGS. 1 and 2.
Figure 11:
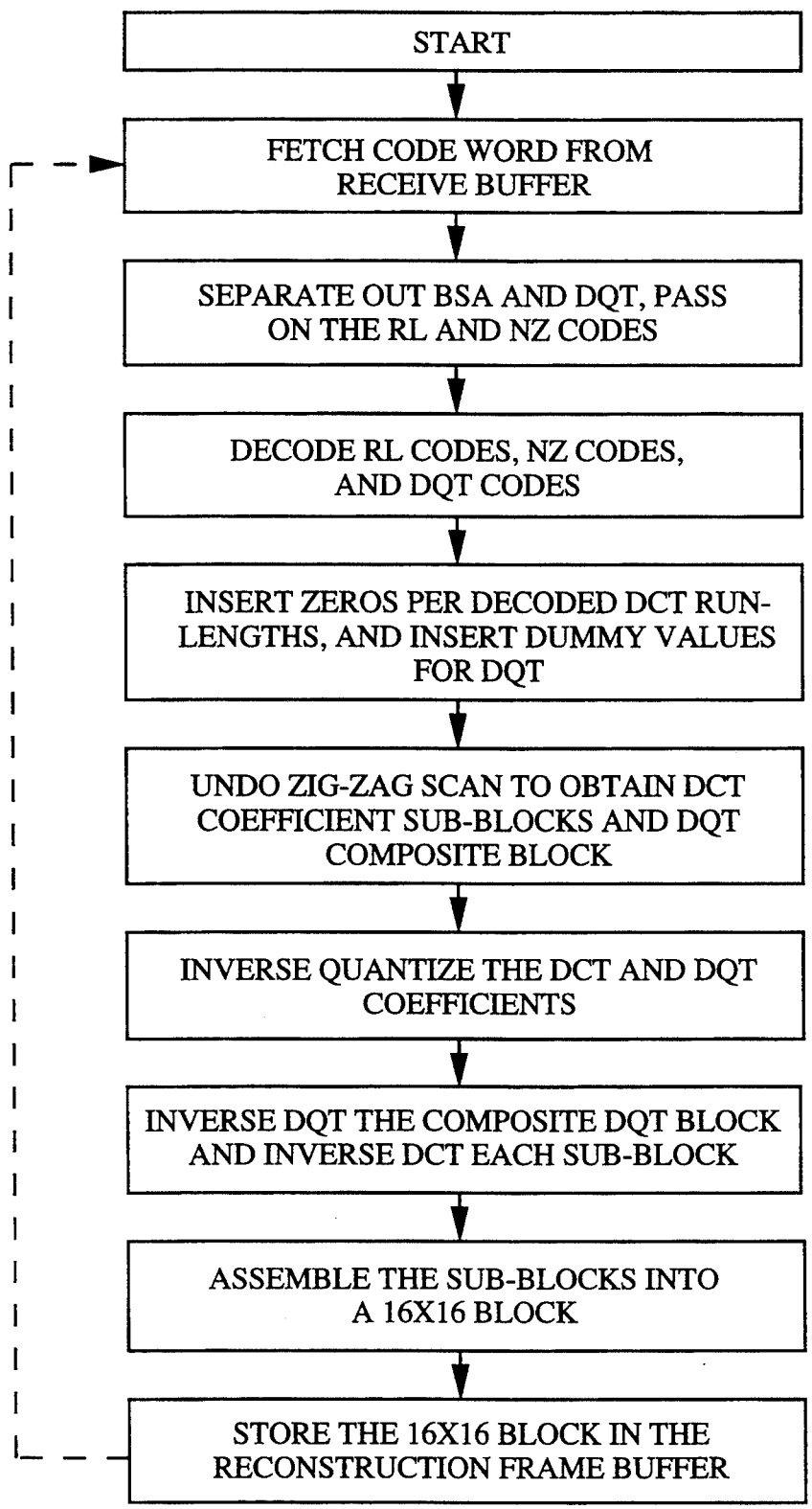
FIG. 11 is a flow chart illustrating the processing steps involved in decoding and decompressing the compressed signal so as to generate pixel data.

FIG. 10 illustrates in block diagram form a flow chart for signal compression of the present invention. FIG. 10 briefly illustrates the steps involved in the processing as discussed with reference to FIGS. 1, 2, 6 and 7. Similarly, FIG. 11 illustrates the decompression process of transmitted compressed image data to result in the output pixel data. The steps illustrated in FIG. 11 are previously discussed with reference to FIG. 9 and 10.

The use of DQT processing techniques furthers the improved image quality provided by the adaptive block size processing scheme without making any sacrifice in the bit per pixel ratio. It is also believed that a bit per pixel ratio of about "1" and even substantially less than this level would provide substantial improvement in image quality sufficient for HDTV applications when using the techniques disclosed herein. It is envisioned that many variations to the invention may be readily made upon review of the present disclosure.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. In an adaptive block size image compression system for compressing a block of input pixel data for transmission by performing a discrete cosine transform (DCT) operation on the block of pixel data and on at least one predetermined level of constituent sub-blocks thereof so as to produce corresponding image block and sub-blocks of DC and AC DCT coefficient values; determining for each image block and each corresponding group of image sub-blocks of DCT coefficient values a bit count corresponding to the number of bits required to respectively encode the image block and each corresponding group of image sub-blocks of DCT coefficient values according to a predetermined coding format; determining from the bit count ones of the image block and corresponding group of image sub-blocks of DCT coefficient values requiring a lesser number of bits to encode according to the coding format; selecting ones of the image block and image sub-blocks of DCT coefficients values requiring a lesser number of bits to encode according to the coding format so as to form a composite image block; ordering the DCT coefficient values of the composite image block according to a predetermined ordering format; encoding the ordered DCT coefficient values of the composite image block according to the encoding format; and assembling the encoded ordered DCT coefficient values of the composite image block along with information identifying the selected ones of the image block and image sub-blocks of DCT coefficient values of the composite image block, a subsystem for providing further compression of the block of pixel data comprising:

discrete quadtree transform means for, receiving said input block of pixel data, performing a first discrete cosine transform (DCT) operation on said block of pixel data so as to produce a corresponding first block of DC and AC DCT coefficient values, performing a series of additional DCT operations with a first additional DCT operation performed on said DC DCT coefficients of said first block of DC and AC DCT coefficient values with each subsequent additional DCT operation performed on resultant DC coefficients values of a proceeding additional DCT operation with a last additional DC operation producing a corresponding last block of DC and AC DCT coefficient values, and providing an output of said last block of DC and AC DCT coefficient values;

code length determination means for, receiving each of said last block of DC and AC DCT coefficient values, generating a corresponding code length value corresponding to a length of each of said last block DC and AC DCT coefficient value as encoded according to said predetermined coding format, inserting each code length value in place of a DC DCT coefficient for each corresponding image block and image sub-block in said bit count determination, wherein said ones of said image block and image sub-blocks are selected for said composite image block using said corresponding code length values; and replacement means for receiving each of said last block of DC and AC DCT coefficient values and replacing each DC DCT coefficient of said selected ones of said image block and image sub-blocks of said composite image block with a corresponding one of said last block DC and AC DCT coefficient values.

2. The subsystem of claim 1 wherein said replacement means further comprises:

ordering means for ordering said last block DC and AC DCT coefficient values according to said predetermined ordering format; and encoder means for encoding each of said last block DC and AC DCT coefficient values according to said predetermined encoding format.

3. In an adaptive block size compression system wherein a block of pixel data is transformed to AC and DC discrete cosine transform (DCT) coefficient data for a block and constituent sub-blocks of pixel data, and wherein the AC and DC DCT coefficient values of a composite block of selected ones of said block and constituent sub-blocks of pixel data are provided for transmission, an apparatus for compressing said DC DCT coefficient values comprising:

discrete quadtree means for receiving at least one block of data representing said block of pixel data, performing a plurality of DCT operations to provide AC and DC DQT coefficient values, with a first DCT operation performed on said at least one block of data to provide first sub-blocks of AC and DC DQT coefficient values, performing at least one additional DCT operation wherein each of said at least one additional DCT operation is performed on resultant DC DQT coefficient data of a preceding DCT operation, and selecting ones of AC and DC DQT coefficient values to provide a DQT composite block of AC and DC coefficient values; and encoding means for receiving said DQT composite block, selecting values from said DQT composite block and encoding said selected values of said DQT composite block to provide a signal indicative of compressed DC DCT coefficient values.

4. The apparatus of claim 3 wherein said discrete quadtree means comprises:

at least one DCT means for receiving said at least one block of data and performing a series of DCT operations to provide AC and DC DQT coefficient values with a first DCT operation performed on said at least one block of data and with additional DCT operations performed on sub-blocks of selected DC DQT coefficient values; and selector means for receiving said AC and DC DQT coefficient values selecting ones of said AC and DC DQT, coefficient values to provide said sub-blocks of selected DC DQT coefficient values in accordance with a predetermined selection format.

5. The apparatus of claim 4 wherein said at least one DCT means comprises a plurality of single DCT means wherein each of said single DCT means is for performing a corresponding one of said series of DCT operations.

6. The apparatus of claim 5 wherein said selector means further comprises:

at least one multiplexer means for receiving AC and DC DQT coefficient values from a corresponding one of said at least one single DCT means and selecting ones of said AC and DC DQT coefficient values to provide intermediate DQT composite blocks of AC and DC DQT coefficient values; and at least one single selector means for receiving said intermediate DQT composite blocks, selecting values from said intermediate DQT composite blocks to provide said sub-blocks of selected DC DQT coefficient values.

7. The apparatus of claim 3 wherein said at least one block of data comprises pixel data.

8. The apparatus of claim 3 wherein said at least one block of data comprises said sub-blocks of AC and DC DCT coefficient values.

9. The apparatus of claim 6 wherein said encoding means is responsive to a selection signal.

10. The apparatus of claim 9 wherein said encoding means comprises a replacement means for receiving said DQT composite block of AC and DC DQT coefficient values and said selection signal and replacing selected values of said composite block of AC and DC DQT coefficient values with a predetermined dummy value in accordance with said selection signal to provide a value replaced composite block.

11. The apparatus of claim 10 wherein said encoding means further comprises:

zig-zag scan serializer means for receiving said value replaced composite block and reordering the members of said value replaced composite block to provide a reordered composite block; and value removal logic means for removing selected values from said reordered composite block in accordance with a predetermined removal format to provide a compressed composite block.

12. The apparatus of claim 11 further comprising quantization means for receiving said compressed composite block and quantizing values of said compressed composite block in accordance with a predetermined quantization format.

13. In an adaptive block size compression system wherein a block of pixel data is transformed to AC and DC discrete cosine transform (DCT) coefficient data for a block and at least one constituent level of sub-blocks of pixel data, and wherein the AC and DC DCT coefficient values of a composite block of selected ones of said block and constituent sub-blocks of pixel data are provided for transmission, a method for compressing said DC DCT coefficient values comprising:

receiving at least one block of data;

performing a series of discrete cosine transformation (DCT) operations to provide AC and DC DQT coefficient values with a first DCT operation performed on said at least one block of data to provide first sub-blocks of AC and DC DQT coefficient values and at least one additional DCT operations is performed on sub-blocks of selected DC DQT coefficient values resultant from a preceding DCT operation of said series of DCT operations; and selecting ones of AC and DC DQT coefficient values resultant from said first DCT operation and said at least one additional DCT operation to provide a DQT composite block of AC and DC DQT coefficient values.

14. The method of claim 13 further comprising the steps of:

receiving a selection signal;

replacing values of said DQT composite block of selected values with a predetermined dummy element in accordance with said selection signal to provide a value replaced composite block.

15. The method of claim 14 further comprising the steps of:

reordering the elements of said value replaced composite block in accordance with a predetermined zig zag format to provide a reordered composite block; and removing selected elements of said reordered composite block in accordance with said selection signal to provide a value removed composite block.

16. The method of claim 15 further comprising the step of quantizing the values of said value removed composite block to provide quantized values.

17. The method of claim 16 further comprising the step of encoding said quantized values in accordance with a predetermined coding format.

18. An image compression apparatus for compressing data representative of a block of pixel data comprising:

transform means for receiving an input block of pixel data and performing a discrete cosine transform (DCT) operation on said block of pixel data and on at least one predetermined level of constituent sub-blocks of pixel data thereof to provide corresponding AC and DC DCT coefficient values for said block and constituent sub-blocks and selecting ones of said AC and DC DCT coefficient values to provide a composite block of AC and DC DCT coefficient values representing said input block of pixel data;

DC DCT compression means for compressing the DC DCT values of said composite block of AC and DC DCT coefficient values by performing a series of DCT operations to provide AC and DC DQT coefficient values, with a first DCT operation performed on sub-blocks of said DC DQT values of said constituent sub-blocks of pixel data and additional DCT operations performed on sub-blocks of DC DQT values from preceding DCT operations of said series of DCT operations and encoding ones of said AC and DC DQT coefficient values to provide compressed DC DCT coefficient values; and combination means for receiving said composite block of AC and DC DCT and said compressed DC DCT coefficient values and combining said composite block of AC and DC DCT and said compressed DC DCT coefficient values to provide a composite block of AC and compressed DC DCT coefficient values.

19. The apparatus of claim 18 wherein said DC DCT compression means comprises:

discrete quadtree means for performing said series of DCT operations on said sub-blocks of DC DQT coefficient values to provide said AC and DC DQT coefficient values, with said first DCT operation performed on said sub-blocks of DC DQT coefficient values of said constituent sub-blocks of pixel data and said additional DCT operations performed on said sub-blocks of DC DQT values from preceding said DCT operations of said series of DCT operations, and selecting ones of said AC and DC DQT coefficient values to provide said DQT composite block; and encoding means for receiving said DQT composite block, selecting values from said DQT composite block and encoding said selected values of said DQT composite block to provide said compressed DC DCT coefficient values.

20. The apparatus of claim 19 wherein said discrete quadtree means comprises:

at least one DCT means for performing said series of DCT operations on said sub-blocks of DC DQT coefficient values to provide said AC and DC DQT coefficient values, with said first DCT operation performed on said sub-blocks of DC DQT coefficient values of said constituent sub-blocks of pixel data and said additional DCT operations performed on said sub-blocks of DC DQT values from said preceding DCT operations of said series of DCT operations, and selecting ones of said AC and DC DQT coefficient values to provide said DQT composite block; and selector means for receiving said AC and DC DQT coefficient values selecting said ones of said AC and DC DQT coefficient values to provide said sub-blocks of DC DQT values.

21. The apparatus of claim 20 wherein said at least one DCT means comprises a plurality of single DCT means wherein each of said single DCT means is for performing a corresponding one of said series of DCT operations.

22. The apparatus of claim 21 wherein said selector means further comprises:

at least one multiplexer means for receiving AC and DC DQT coefficient values from a corresponding one of said at least one single DCT means and selecting ones of said AC and DC DQT coefficient values to provide intermediate DQT composite blocks of AC and DC coefficient values; and at least one single selector means for receiving said intermediate DQT composite blocks, selecting values from said intermediate DQT composite blocks to provide said sub-blocks of selected DC DQT coefficient values.

23. The apparatus of claim 22 further comprising:

DC code length means for receiving said compressed DC DCT coefficient values and providing a DC code length indicative of the number of bits to encode said DC DCT coefficient data of said blocks and sub-blocks of pixel data;

AC code length means for receiving said blocks and sub-blocks of AC and DC DCT coefficient values and providing an AC code length indicative of the number of bits to encode said AC DCT coefficient data of said blocks and sub-blocks of pixel data; and block selection means for receiving said DC code length and said AC code length and providing a selection signal indicative of said selected ones of said block and sub-blocks of AC and compressed DC DCT coefficient values of said composite block of AC and compressed DC DCT coefficient values in accordance with a weighted sum of said AC code length and said DC code length.

24. The apparatus of claim 23 wherein said encoding means is responsive to said selection signal.

25. The apparatus of claim 24 wherein said encoding means comprises replacement means for receiving said DQT composite block and said selection signal and replacing selected values of said DQT composite block with a predetermined dummy value to provide a value replaced composite block.

26. The apparatus of claim 25 wherein said encoding means further comprises:

zig-zag scan serializer means for receiving said value replaced composite block and reordering values of said value replaced composite block to provide a reordered composite block; and value removal logic means for receiving said reordered composite block and removing selected values from said reordered composite block in accordance said selection signal to provide a value removed composite block.

27. The apparatus of claim 26 further comprising quantization means for receiving said value removed composite block and quantizing values of said value removed composite block in accordance with a predetermined quantization format a quantized DC value composite block.

28. A method for compressing image data for a block of pixel data comprising the steps of:

receiving an input block of pixel data;

performing a discrete cosine transform (DCT) operation on said block of pixel data and on at least one predetermined level of constituent sub-blocks of pixel data thereof to provide corresponding AC and DC DCT coefficient values for said block and constituent sub-blocks;

selecting ones of said AC and DC DCT coefficient values to provide a composite block of AC and DC DCT coefficient values representing said input block of pixel data;

performing a series of DCT operations on said DC DCT coefficient values for said constituent sub-blocks to provide AC and DC DQT coefficient values, with a first DCT operation performed on said DC DCT values of said constituent sub-blocks of pixel data and additional DCT operations performed on sub-blocks of DC DQT values from preceding DCT operations of said series of DCT operations;

encoding ones of said AC and DC DQT coefficient values to provide compressed DC DCT coefficient values; and combining said composite block of AC and DC DCT and said compressed DC DCT coefficient values to provide a composite block of AC and compressed DC DCT coefficient values.

29. The method of claim 28 further comprising the steps of:

providing a DC code length indicative of the number of bits to encode said DC DCT coefficient data of said blocks and sub-blocks of pixel data;

providing an AC code length indicative of the number of bits to encode said AC DCT coefficient data of said blocks and sub-blocks of pixel data; and providing a selection signal in accordance with a weighted sum of said AC code length and DC code length.

30. The apparatus of claim 29 wherein said step of encoding is responsive to said selection signal.

31. The method of claim 30 wherein said step of step of encoding comprises:

replacing selected ones of said AC and DC DQT coefficient values with a predetermined dummy value to provide a value removed composite block;

reordering the members of said value removed composite block in accordance with a predetermined zig zag format to provide a reordered composite block; and removing selected values from said reordered composite block in accordance with a predetermined value removal format to provide a value removed composite block.

32. The method of claim 31 further comprising quantizing the values of said value removed composite block in accordance with a predetermined quantization format to provide compressed DC values.

33. In an image decoder wherein an image block of pixel data is processed by performing a discrete cosine transform (DCT) operation on said block of pixel data and on at least one predetermined level of constituent sub-blocks of pixel data thereof to provide corresponding block and sub-blocks of AC and DC DCT coefficient values, and wherein said DC DCT coefficient values are compressed by performing a series of DCT operations performed on said DC DCT coefficient values of said sub-blocks of pixel data to provide AC and DC DQT coefficient values with a first of said series of DCT operations performed on said sub-blocks of DC DCT coefficient values with at least one additional DCT of said series of additional DCT operations performed on selected sub-blocks of said DC DCT coefficient values and said DC DQT of previous DCT operations of said series of DCT operations to provide a composite block of AC and DC DQT coefficient values, and wherein selected values of said composite block of AC and DC DQT coefficient values are encoded to provide compressed DC DCT coefficient values, and wherein a signal is provided indicative of said compressed DC DCT coefficient values and selected ones of said block and sub-blocks of AC and DC DCT coefficient values, an apparatus for decoding said compressed DC DCT coefficient values comprising:

separator means for receiving said signal indicative of said compressed DC DCT coefficient values and selected AC DCT values of said block and sub-blocks of AC and DC DCT coefficient values and providing a signal indicative of said compressed DC DCT coefficient values in accordance with a predetermined separation format;

decoder means for receiving said signal indicative of said compressed DC DCT coefficient values and providing said decoded DC DCT coefficient values in accordance with a predetermined decoding format; and inverse discrete quadtree means for receiving said decoded DC DCT coefficient values, performing a series of inverse discrete cosine transformation (IDCT) operations to provide AC and DC IDCT coefficient values with a first IDCT performed on selected values of said processed DC DCT coefficient values and additional IDCT operations performed on additional selected values of said processed DC DCT coefficient values and resultant AC and DC IDCT values from preceding IDCT operations and wherein ones of said AC and DC IDCT coefficient values are provided as said DC DCT coefficient values.

34. The apparatus of claim 33 wherein said decoder means comprises:

lookup table means for receiving said signal indicative of said compressed DC DCT coefficient values, providing a composite block of quantized processed DC DCT coefficient values in accordance with a predetermined lookup format; and inverse quantizer means for receiving said composite block of quantized processed DC DCT coefficient values and providing said decoded DC DCT coefficient values in accordance with a predetermined inverse quantization format.

35. The apparatus of claim 34 wherein said decoder means further comprises an expansion means disposed between lookup table means and said inverse quantizer means for receiving said composite block of quantized processed DC DCT coefficient values and inserting a predetermined dummy value in said composite block of quantized processed DC DCT coefficient values and reordering said resulting values in accordance with an inverse zig zag format.

36. The apparatus of claim 35 wherein said expansion means is responsive to a block size assignment signal.

37. The apparatus of claim 36 wherein said inverse discrete quadtree means comprises:

selector means for receiving said decoded DC DCT coefficient values and resultant AC and DC IDCT values from previous IDCT operations, and providing sub-blocks of selected decoded DC DCT coefficient values and resultant AC and DC IDCT values in accordance with a predetermined selection format; and at least one inverse discrete cosine means for receiving said selected sub-blocks and performing an IDCT operation of said series IDCT operations on said sub-blocks of selected decoded DC DCT coefficient values and resultant AC and DC IDCT values.

38. The apparatus of claim 37 wherein said at least one IDCT means comprises a plurality of single IDCT means wherein each of said single IDCT means is for performing a corresponding one of said series of IDCT operations.

39. The apparatus of claim 38 wherein said selector means comprises:

plurality of separator means with a first separator means for receiving said decoded DC DCT coefficient values, providing a block of DCT coefficient values to a corresponding single IDCT means and separately providing remaining AC and DC DCT coefficient values to a corresponding multiplexer means and additional separator means for receiving a corresponding intermediate composite block of IDCT coefficient values and separating sub-blocks of AC and DC IDCT coefficient values from remaining AC and DC DCT coefficient values; and plurality of multiplexer means each of said multiplexer means for receiving resultant AC and DC IDCT coefficient values from a corresponding single IDCT means and said remaining AC and DC DCT coefficient values to provide an intermediate composite block of IDCT coefficient values.

40. In an image decoder wherein an image block of pixel data is processed by performing a discrete cosine transform (DCT) operation on said block of pixel data and on at least one predetermined level of constituent sub-blocks of pixel data thereof to provide corresponding block and sub-blocks of AC and DC DCT coefficient values, and wherein said DC DCT coefficient values are compressed by performing a series of DCT operations performed on said DC DCT coefficient values of said sub-blocks of pixel data to provide AC and DC DQT coefficient values with a first of said series of DCT operations performed on said sub-blocks of DC DCT coefficient values with at least one additional DCT of said series of additional DCT operations performed on selected sub-blocks of said DC DCT coefficient values and said DC DQT coefficient values of previous DCT operations of said series of DCT operations to provide a composite block of AC and DC DQT coefficient values, and wherein selected values of said composite block of AC and DC DQT coefficient values are encoded to provide compressed DC DCT coefficient values, and wherein a signal is provided indicative of said compressed DC DCT coefficient values and selected ones of said block and sub-blocks of AC and DC DCT coefficient values, a method for decoding said compressed DC DCT coefficient values comprising the steps of:

receiving said signal indicative of a composite block of AC and compressed DC coefficient values;

providing compressed DC coefficient values from said composite block of AC and compressed DC coefficient values in accordance with a predetermined separation format;

decoding compressed DC coefficient values accordance with a predetermined decoding format to provide decoded DC DCT coefficient values; and performing a series of inverse discrete cosine transformation (IDCT) operations to provide AC and DC IDCT coefficient values with a first IDCT performed on blocks of selected values of said compressed DC DCT coefficient values and additional IDCT operations performed on additional selected values of said compressed DC DCT coefficient values and resultant AC and DC IDCT values from preceding IDCT operations of said series of IDCT operations.

41. The apparatus of claim 40 wherein said step of decoding comprises the steps of comprises:

receiving said signal indicative of said compressed DC DCT coefficient values;

providing a composite block of quantized processed DC DCT coefficient values in accordance with a predetermined lookup format; and inverse quantizing said processed DC DCT coefficient values in accordance with a predetermined inverse quantization format to provide said decoded DC DCT coefficient values.

42. The apparatus of claim 41 wherein said step of decoding further comprises the steps of:

inserting a predetermined dummy value in said composite block of quantized processed DC DCT coefficient values to provide a value inserted composite block; and reordering said value inserted composite block in accordance with a inverse zig zag format.

43. The apparatus of claim 42 wherein said step of decoding is responsive to a block size assignment signal.

44. In an image decoder wherein an image block of pixel data is processed by performing a discrete cosine transform (DCT) operation on said block of pixel data and on at least one predetermined level of constituent sub-blocks of pixel data thereof to provide corresponding block and sub-blocks of AC and DC DCT coefficient values, performing a series of additional DCT operations on said sub-blocks of DC DCT coefficient values with additional DCT operations performed on selected sub-blocks of said DC DCT coefficient values and resultant DC DCT of previous DCT operations of said series of DCT operations to provide a composite block of AC and DC DQT coefficient values, encoding selected values of said composite block of AC and DC DQT coefficient values to provide compressed DC DCT coefficient values and combing selected ones of said block and sub-blocks of AC and DC DCT coefficient values and said compressed DC DCT coefficient values to provide a signal indicative of a compressed block of AC and compressed DC coefficient values, an apparatus for decoding said processed DC DCT coefficient values comprising:

separator means for receiving said signal indicative of a composite block of AC and compressed DC coefficient values and separating a signal indicative of said processed DC DCT coefficient values from said signal indicative of a compressed block of AC and compressed DC coefficient values in accordance with a predetermined separation format;

decoder means for receiving said signal indicative of said processed DC DCT coefficient values and providing said processed DC DCT coefficient values in accordance with a predetermined decoding format;

inverse discrete quadtree means for receiving said processed DC DCT coefficient values, performing a series of inverse discrete cosine transformation (IDCT) operations to provide AC and DC IDCT coefficient values with a first IDCT performed on selected values of said processed DC DCT coefficient values and additional IDCT operations performed on additional selected values of said processed DC DCT coefficient values and resultant AC and DC IDCT values from preceding IDCT operations;

combination means for receiving said AC DCT coefficient values and said DC IDCT coefficient values to provide a composite block of AC and decoded DC coefficient values and inverse transform for performing at least one IDCT operation on said composite block of AC and decoded DC coefficient values to provide a composite pixel block.

45. The apparatus of claim 44 wherein said decoder means comprises:

lookup table means for receiving said signal indicative of said compressed DC DCT coefficient values providing a composite block of quantized processed DC DCT coefficient values in accordance with a predetermined lookup format; and inverse quantizer means for receiving said composite block of quantized processed DC DCT coefficient values to provide said processed DC DCT coefficient values in accordance with a predetermined inverse quantization format.

46. The apparatus of claim 45 wherein said decoder means further comprises:

value insertion logic means for receiving said composite block of quantized processed DC DCT coefficient values for inserting a predetermined dummy value in said composite block of quantized processed DC DCT coefficient values to provide a value inserted composite block; and reordering means for receiving said value inserted composite block reordering the values of said value inserted composite block in accordance with a predetermined inverse zig zag format.

47. The apparatus of claim 46 wherein said value insertion logic means and reordering means is responsive to a block size assignment signal.

48. The apparatus of claim 47 wherein said inverse discrete quadtree means comprises:

selector means for receiving said processed DC DCT coefficient values and said AC and DC IDCT coefficient values and providing blocks of selected ones said of processed DC DCT coefficient values and said AC and DC IDCT coefficient values in accordance with a predetermined selection format; and at least one IDCT means for receiving said blocks of selected ones of processed DC DCT coefficient values and AC and DC IDCT coefficient values and performing a series of IDCT operations with each of said IDCT operations of said series of IDCT operations performed on blocks of said processed DC DCT coefficient values and resultant AC and DC IDCT values.

49. The apparatus of claim 48 wherein said at least one IDCT means comprises a plurality of single IDCT means wherein each of said single IDCT means is for performing a corresponding one IDCT operation of said series of inverse discrete cosine operation.

50. The apparatus of claim 49 wherein said selector means comprises:

plurality of separator means with a first separator means for receiving said processed DC DCT coefficient values providing a block of DCT coefficient values and separately providing remaining AC and DC DCT coefficient values with additional separator means for receiving a corresponding intermediate composite block of IDCT coefficient values and providing blocks of AC and DC IDCT coefficient values and separately providing additional remaining AC and DC IDCT coefficient values; and plurality of multiplexer means each of said multiplexer means for receiving resultant AC and DC IDCT coefficient values from a corresponding single IDCT means and remaining AC and DC DCT coefficient values from a corresponding separator means to provide an intermediate composite block of IDCT coefficient values.

51. A method for decoding a block of pixel data wherein an image block of pixel data is processed by performing a discrete cosine transform (DCT) operation on said block of pixel data and on at least one predetermined level of constituent sub-blocks of pixel data thereof to provide corresponding block and sub-blocks of AC and DC DCT coefficient values, performing a series of additional DCT operations on said sub-blocks of DC DCT coefficient values with additional DCT operations performed on selected sub-blocks of said DC DCT coefficient values and resultant DC DCT of previous DCT operations of said series of DCT operations to provide a composite block of AC and DC DQT coefficient values, encoding selected values of said composite block of AC and DC DQT coefficient values to provide compressed DC DCT coefficient values and combining selected ones of said block and sub-blocks of AC and DC DCT coefficient values and said compressed DC DCT coefficient values to provide a signal indicative of a compressed block of AC and compressed DC coefficient values, a method for decoding said block of pixel data comprising the steps of:

receiving said signal indicative of a composite block of AC and compressed DC coefficient values;

providing said compressed DC coefficient values of said composite block of AC and compressed DC coefficient values;

separately providing said AC coefficient values of said composite block of AC and compressed DC coefficient values;

decoding said compressed DC DCT coefficient values in accordance with a predetermined decoding format to provide decoded DC DCT values;

performing a series of inverse discrete cosine transformation (IDCT) operations to provide AC and DC IDCT coefficient values with a first IDCT performed on blocks of selected values of said processed DC DCT coefficient values and additional IDCT operations performed on blocks of selected values of said processed DC DCT coefficient values and resultant AC and DC IDCT values from preceding IDCT operations wherein ones of said AC and DC IDCT values and decoded DCT values are provided as uncompressed DC DCT coefficient values; and combining said AC DCT coefficient values and said uncompressed DC DCT coefficient values to provide a composite block of AC and uncompressed DC coefficient values; and performing at least one IDCT operation on said composite block of AC and uncompressed DC coefficient values to provide a composite pixel block.

52. The method of claim 51 wherein said step of decoding comprises the steps of:

receiving said compressed DC DCT coefficient values;

providing a composite block of quantized processed DC DCT coefficient values in accordance with a predetermined lookup format; and inverse quantizing said composite block of quantized processed DC DCT coefficient values.

53. The method of claim 52 wherein said step of decoding further comprises:

inserting a predetermined dummy value in said composite block of quantized processed DC DCT coefficient values to provide a value inserted composite block; and reordering the values of said value inserted composite block in accordance with a predetermined inverse zig zag format.

54. The method of claim 53 wherein said steps of inserting said predetermined dummy value and reordering the values of said value inserted composite block are responsive to a block size assignment signal.

55. In an adaptive block size compression system wherein a block of pixel data is transformed to AC and DC discrete cosine transform (DCT) coefficient data for constituent blocks of vary block size, a sub-system for compressing said DC DCT coefficient data comprising:

discrete quadtree means having a first input for receiving at least one block of data and having an output wherein said discrete quadtree means comprises:

plurality of DCT means with a first DCT means having an input for receiving said at least one block of data and having an output with each additional DCT means having an input and an output; and at least one selector means disposed between each of said plurality of DCT means having and input coupled to a corresponding DCT means output and output coupled to a corresponding one of said additional DCT means input; and selection means having an input coupled to said discrete quadtree means output and having an output.

56. The apparatus of claim 55 wherein said at least one selector means has a second output and said discrete quadtree means further comprises at least one multiplexer means disposed between one of said additional DCT means and one of said at least one selector means having a first input coupled to said additional DCT means output and a second input coupled to said selector means second output and having an output coupled to said selector means input.

57. The apparatus of claim 56 wherein selection means comprises:

first selection multiplexer having a first input coupled to said DQT means, a second input for receiving a selection signal, a third input for receiving a dummy signal, and having an output; and additional selection multiplexer means having a first input coupled to a corresponding selection multiplexer output, a second input for receiving a selection signal, a third input for receiving a dummy signal, and having an output.

58. The apparatus of claim 57 wherein said selection means further comprises:

zig zag scan serializer having an input coupled to a last selection multiplexer means of said additional selection multiplexer means output and having an output;

value removal logic means having an input coupled to said zig zag scan serializer output and having and output; and code lookup table means having an input coupled to said value removal logic means output and having an output.

59. In an image decoder wherein and image block of pixel data is processed by performing a discrete cosine transform (DCT) operation on said block of pixel data and on at least one predetermined level of constituent sub-blocks of pixel data thereof, and providing corresponding block and sub-blocks of AC and DC DCT coefficient values and wherein said DC DCT coefficient values is further processed by performing a series of at least one additional DCT operation on said sub-blocks of DC DCT coefficient values, a subsystem for decoding said processed DC DCT coefficient values comprising:

decoder means having an input for receiving a signal indicative of said processed DC DCT coefficient values and having an output; and inverse discrete quadtree means having an input coupled to said decoder means output, wherein said inverse discrete quadtree means comprises:

plurality of separator means with a first separator means having an input for receiving said signal indicative of said processed DC DCT coefficient values and additional separator means having an input and an output;

at least one inverse discrete means disposed between said plurality of separator means having an input coupled to a corresponding separator means output.

60. The apparatus of claim 59 wherein said separator means further having a second output and wherein said discrete quadtree means further comprises:

at least one multiplexer means having an input for receiving a timing signal, a second input coupled to a corresponding inverse cosine transform means output and a third input coupled to a corresponding second separator means output.

61. The apparatus of claim 60 wherein said decoder means comprises:

decode lookup table means having an input for receiving signal indicative of said processed DC DCT coefficient values and having an output;

value insertion logic means having a first input coupled to said decode lookup table means output, a second input for receiving a selection signal, and having an output;

inverse zig-zag scan insertion logic means having a first input coupled to said value insertion logic means output an a second input for receiving a selection signal, and having an output; and inverse quantizer means having an input coupled to said inverse zig-zag scan insertion logic means output and having an output.

* * * * *